United States Patent
Dawkins et al.

(10) Patent No.: US 11,327,852 B1
(45) Date of Patent: May 10, 2022

(54) LIVE MIGRATION/HIGH AVAILABILITY SYSTEM

(71) Applicant: Dell Products L.P., Round Rock, TX (US)

(72) Inventors: William Price Dawkins, Lakeway, TX (US); Robert W. Hormuth, Cedar Park, TX (US); Elie Jreij, Pflugerville, TX (US); Gaurav Chawla, Austin, TX (US); Mark Steven Sanders, Roanoke, VA (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/077,869

(22) Filed: Oct. 22, 2020

(51) Int. Cl.
*G06F 11/14* (2006.01)
*G06F 11/20* (2006.01)

(52) U.S. Cl.
CPC ...... *G06F 11/1484* (2013.01); *G06F 11/1451* (2013.01); *G06F 11/1464* (2013.01); *G06F 11/1469* (2013.01); *G06F 11/203* (2013.01); *G06F 2201/84* (2013.01)

(58) Field of Classification Search
CPC ............ G06F 11/1451; G06F 11/1469; G06F 11/1484; G06F 11/1464; G06F 11/203; G06F 2201/84
See application file for complete search history.

(56) References Cited

U.S. PATENT DOCUMENTS

| 9,686,281 | B2 | 6/2017 | Bulusu et al. | |
| 11,099,956 | B1* | 8/2021 | Polimera | G06F 9/45558 |
| 2010/0306494 | A1* | 12/2010 | DeVilbiss | G06F 9/5016 |
| | | | | 711/170 |
| 2014/0068040 | A1 | 3/2014 | Neti et al. | |
| 2015/0096011 | A1 | 4/2015 | Watt | |
| 2015/0220406 | A1* | 8/2015 | Tsirkin | G06F 11/1435 |
| | | | | 714/15 |
| 2015/0254088 | A1* | 9/2015 | Chou | G06F 3/061 |
| | | | | 709/212 |
| 2016/0283281 | A1* | 9/2016 | Antony | G06F 3/0617 |
| 2017/0177222 | A1* | 6/2017 | Singh | G06F 9/45558 |
| 2019/0392117 | A1* | 12/2019 | Viswanathan | H04L 9/0877 |

* cited by examiner

*Primary Examiner* — Jigar P Patel
(74) *Attorney, Agent, or Firm* — Joseph Mencher

(57) ABSTRACT

A live migration/high availability system includes a first computing system having a first SCP subsystem coupled to first computing system components and a first hypervisor subsystem that provides a first virtual machine. Each time the first SCP subsystem receives snapshot commands from the hypervisor subsystem, it retrieves respective SCP component state information that was not retrieved in response to a previous snapshot command from each first SCP component included in the first SCP subsystem, and uses the respective SCP component state information to generate a respective SCP subsystem snapshot based on that snapshot command. The first SCP subsystem then transmits the SCP subsystem snapshots to a second SCP subsystem in a second computing system, and the second SCP subsystem uses the SCP subsystem snapshots to allow a second hypervisor subsystem on the second computing system to provide a second virtual machine that operates the same as the first virtual machine.

20 Claims, 19 Drawing Sheets

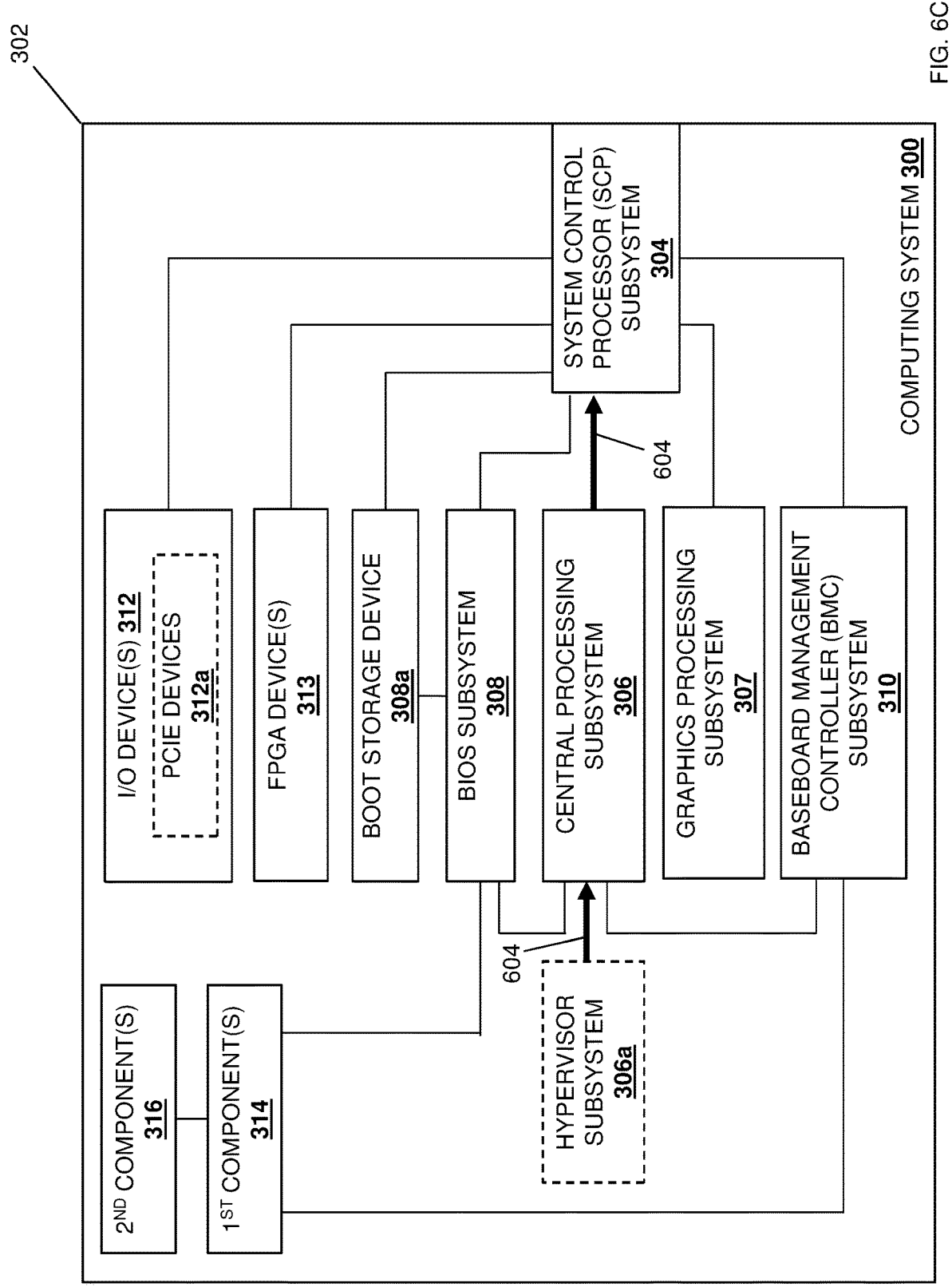

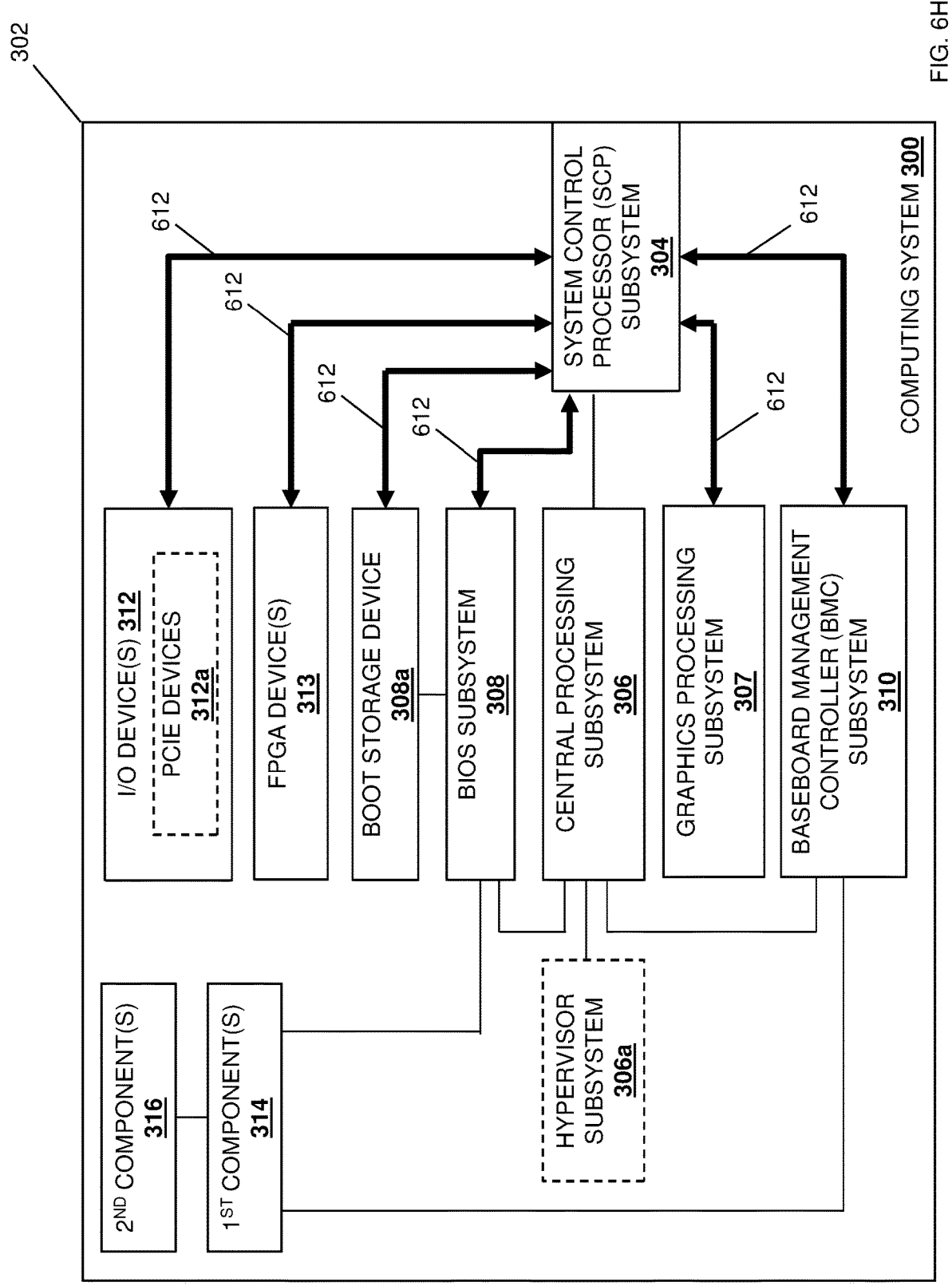

LIVE MIGRATION/HIGH AVAILABILITY SYSTEM

BACKGROUND

The present disclosure relates generally to information handling systems, and more particularly to performing live migration or high availability operations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may have their functionality migrated using "live migration" techniques, or have their functionality backed up using "high availability" techniques. For example, live migration techniques may provide for the copying and migration of a virtual machine that is running on a first server device to a second server device such that the memory, storage, and networking connectivity of the virtual machine running on the first server device is provided on the second server device without any associated disconnection of a client, application(s), and/or workloads being provided by the virtual machine running on the first service device. High availability techniques utilize similar operations as live migration techniques in order to ensure optimal performance (e.g., uptime) for a virtual machine by, for example, maintaining a copy of a virtual machine running on a first server device so that the virtual machine may be quickly provided on a second server device in the event of the unavailability (e.g., failure) of the first server device.

Conventional live migration techniques typically operate by pausing the virtual machine running on a first server device, collecting server device state information from components (e.g., Central Processing Unit (CPU) and CPU memory state information) in the first server device, resuming the virtual machine running on the first server device, generating a server device migration snapshot using that server device state information, copying that server device migration snapshot to a second server device, subsequently pausing the virtual machine running on the first server device again, collecting any differential server device state information from components in the first server device that has changed since the previous server device migration snapshot was generated, resuming the virtual machine running on the first server device, generating a differential server device migration snapshot using that differential server device state information, copying that differential server device migration snapshot to the second server device, and repeating that process until the differential server device state information from components in the first server device that has changed since the previous server device migration snapshot was generated is sufficiently small enough. The virtual machine running on the first server device may then be paused a final time, final server device state information may be collected from components in the first server device, a final server device migration snapshot may be generated using that final server device state information, and that final server device migration snapshot may be copied to the second server device. The virtual machine may then be resumed on the first server device, and the server device migration snapshots may be used on the second server device to start the virtual machine on the second server device, and one of skill in the art will recognize that the virtual machine will operate on the second server device in the same (or a substantially similar) manner as it does on the first server device.

High availability techniques operate similarly to the live migration techniques discussed above by pausing the virtual machine running on a first server device, collecting server device state information from components (e.g., CPU and CPU memory state information) in the first server device, resuming the virtual machine running on the first server device, generating a server device migration snapshot using that server device state information, pausing the virtual machine running on the first server device again, collecting any differential server device state information from components in the first server device that has changed since the previous server device migration snapshot was generated, generating a differential server device migration snapshot using that differential server device state information, and repeating that process. In the event the virtual machine running on the first server device become unavailable (e.g., due to a failure of the first server device), the server device migration snapshots may be copied to a second server device and used on the second server device to start the virtual machine on that second server device, which one of skill in the art will recognize allows the virtual machine to operate on the second server device in the same (or a substantially similar) manner as it did on the first server device at the time of the most recent server device migration snapshot.

However, while such live migration/high availability operations provide for the live migration/high availability of conventional server devices, issues arise when server devices are provided with subsystems that generate their own subsystem state information that may be inaccessible or otherwise unavailable to a hypervisor on the server device that performs the live migration/high availability operations discussed above, which prevents the creation of server device migration snapshots of that server device/subsystem combination. For example, the inventors of the present disclosure have developed a System Control Processor (SCP) subsystem that may be provided in server devices and/or other computing systems in order to provide communication functionality (e.g., Network Interface Controller (NIC) functionality) for the server device/computing system, while also performing perform a variety of advanced functionality (e.g., networking functionality, boot functionality, management controller functionality, etc.) for that server device/computing system. However, in the process of the operation of the SCP subsystem, SCP components included in and/or connected to the SCP subsystem generate SCP subsystem state information, and that SCP subsystem state information is not accessible or is otherwise unavailable to a hypervisor on the server device that performs the live migration/high availability operations. As such, conventional live migration/high availability techniques for server devices and/or other computing systems are not sufficient to fully replicate a virtual machine on server device/computing system including an SCP subsystem.

Accordingly, it would be desirable to provide a live migration/high availability system that addresses the issues discussed above.

SUMMARY

According to one embodiment, a first System Control Processor (SCP) subsystem, includes a System Control Processor (SCP) processing system; and an SCP memory system that is coupled to the SCP processing system and that includes instructions that, when executed by the SCP processing system, cause the SCP processing system to provide an SCP snapshot engine that is configured to: receive, from a first hypervisor subsystem in a first computing system that provides a first virtual machine, a plurality of snapshot commands and, each time a snapshot command is received: retrieve, based on that snapshot command and from each of a plurality of first SCP components that are included in the first SCP subsystem, respective SCP component state information that was not retrieved in a previous snapshot command; and generate, using the respective SCP component state information and based on that snapshot command, a respective SCP subsystem snapshot; and transmit the SCP subsystem snapshots to a second SCP subsystem in a second computing system, wherein the SCP subsystem snapshots are configured for use in configuring the second SCP subsystem to operate along with a second hypervisor subsystem on the second computing system to provide a second virtual machine that operates the same as the first virtual machine.

BRIEF DESCRIPTION OF THE DRAWINGS

FIG. 6C is a schematic view illustrating an embodiment of the computing system of FIG. 3A operating during the method of FIGS. 5A and 5B.

FIG. 6H is a schematic view illustrating an embodiment of the computing system of FIG. 3A operating during the method of FIGS. 5A and 5B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
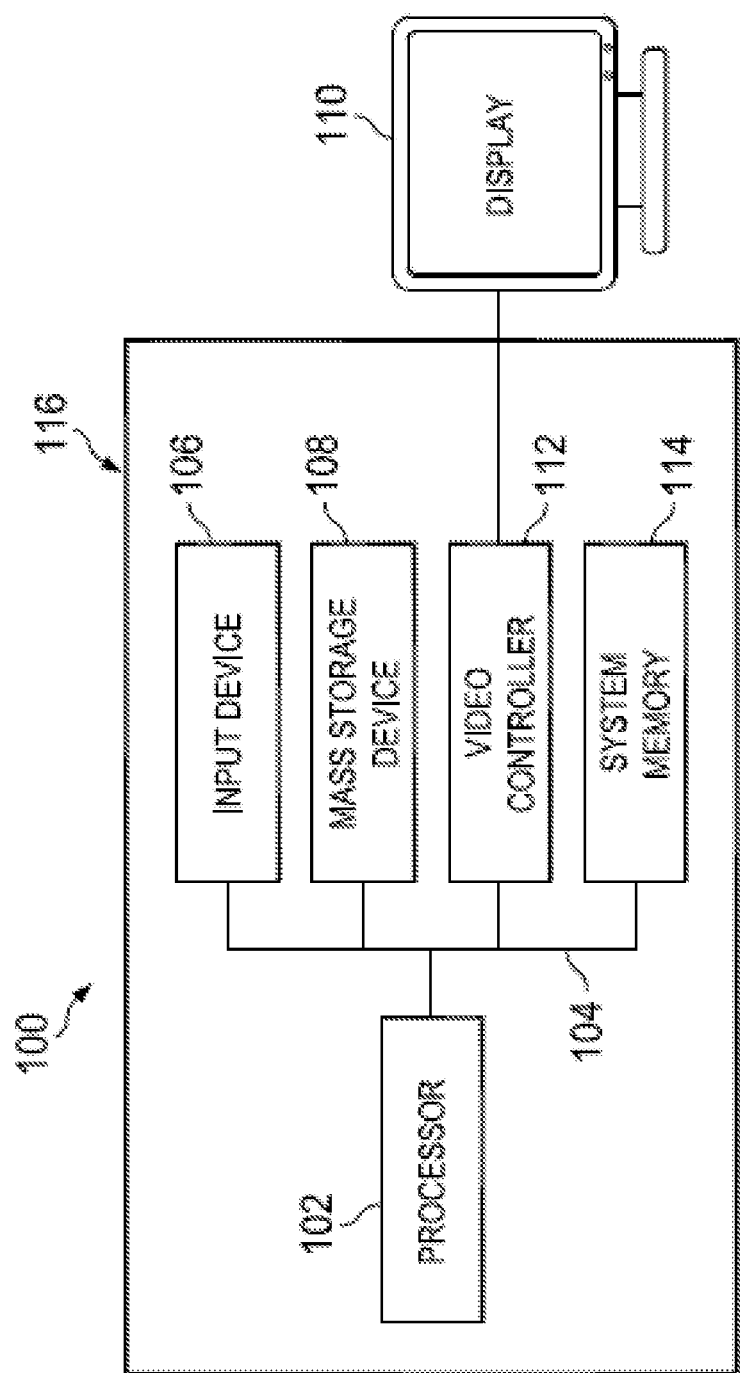
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
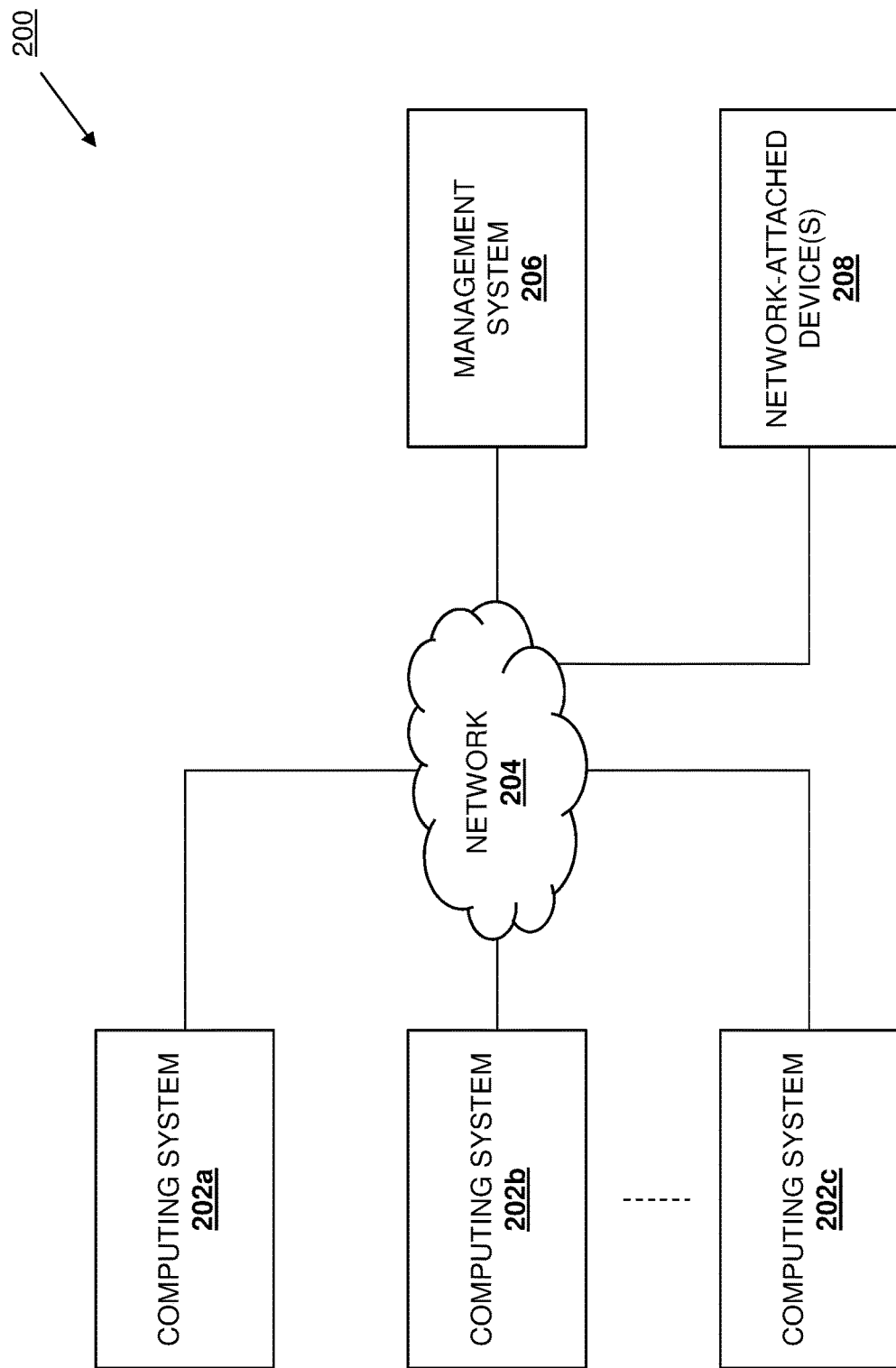
FIG. 2 is a schematic view illustrating an embodiment of a networked system.

Referring now to FIG. 2, an embodiment of a networked system 200 is illustrated in which the live migration/high availability system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c (e.g., an SCP manager for the SCP subsystems included in the computing systems 202a-202c discussed below, etc.). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the SCP cloning system of the present disclosure may be utilized with a variety of components and component configurations, and/ or may be provided in a variety of computing system/ network configurations, while remaining within the scope of the present disclosure as well.

Figure 3A:
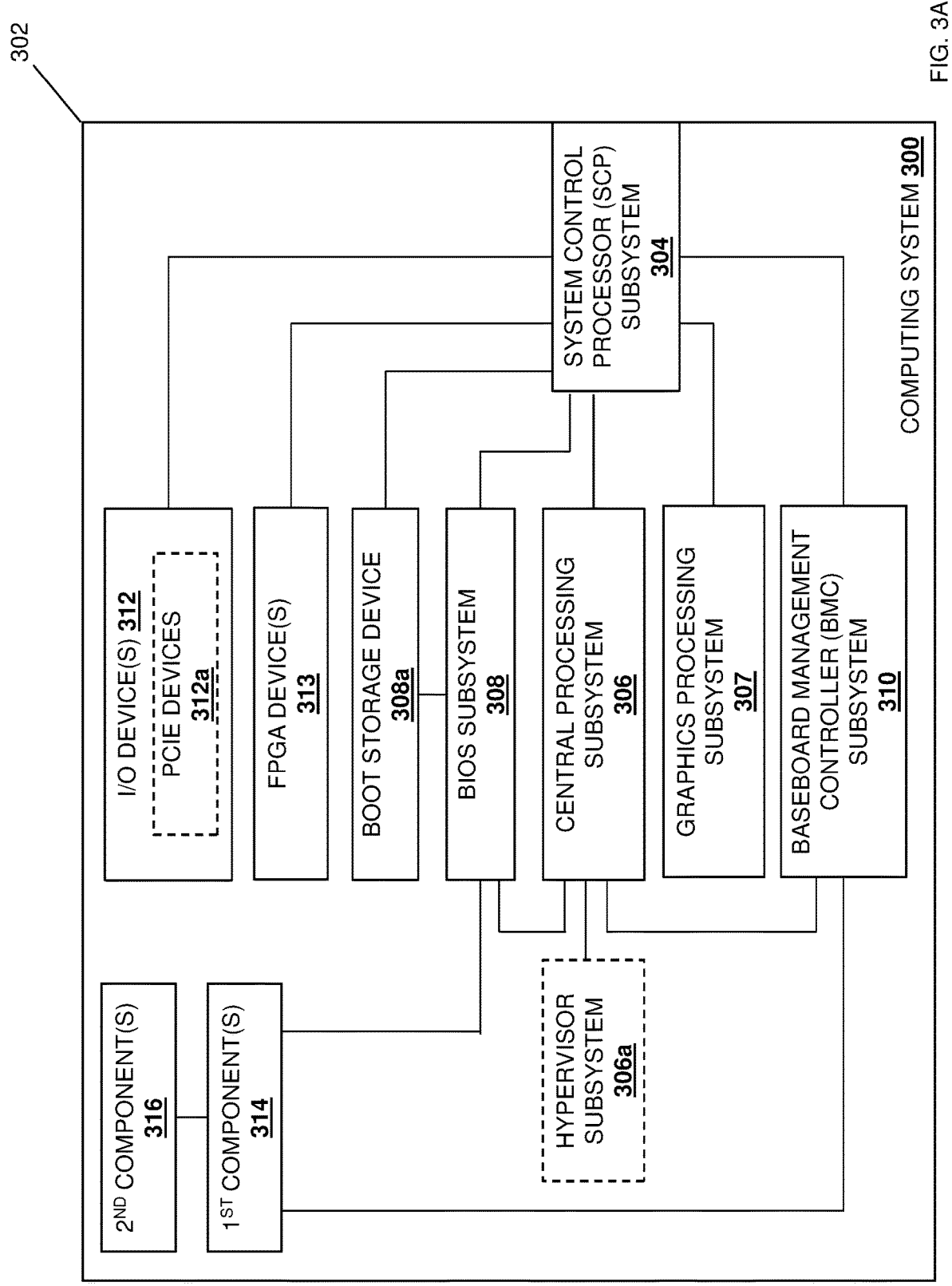
FIG. 3A is a schematic view illustrating an embodiment of a computing system that may be included in the networked system of FIG. 2 and that may utilize the live migration/high availability system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing system that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the live migration/high availability functionality that is discussed in further detail below. In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/ co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. In the examples provided below, the central processing subsystem 306 is configured to read instructions from a memory system (not illustrated) in the chassis 302 in order to provide a hypervisor subsystem 306a that is configured to perform the computing system snapshot operations discussed below, other live migration/high availability operations discussed below, virtual machine provisioning, and/or any other hypervisor operations that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304 and the BIOS subsystem 308, and that one of skill in the art in possession of the present disclosure will recognize may store a boot image that may be accessible to and utilized by the BIOS subsystem 308 during boot operations. For example, the boot storage device 308a may be provided by Boot Optimized Storage Solution (BOSS) available from DELL® Inc. of Round Rock, Tex., United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that as discussed below may be programmed to perform any of a variety of functions for the computing system 300 and/or the SCP subsystem 304.

Figure 3B:
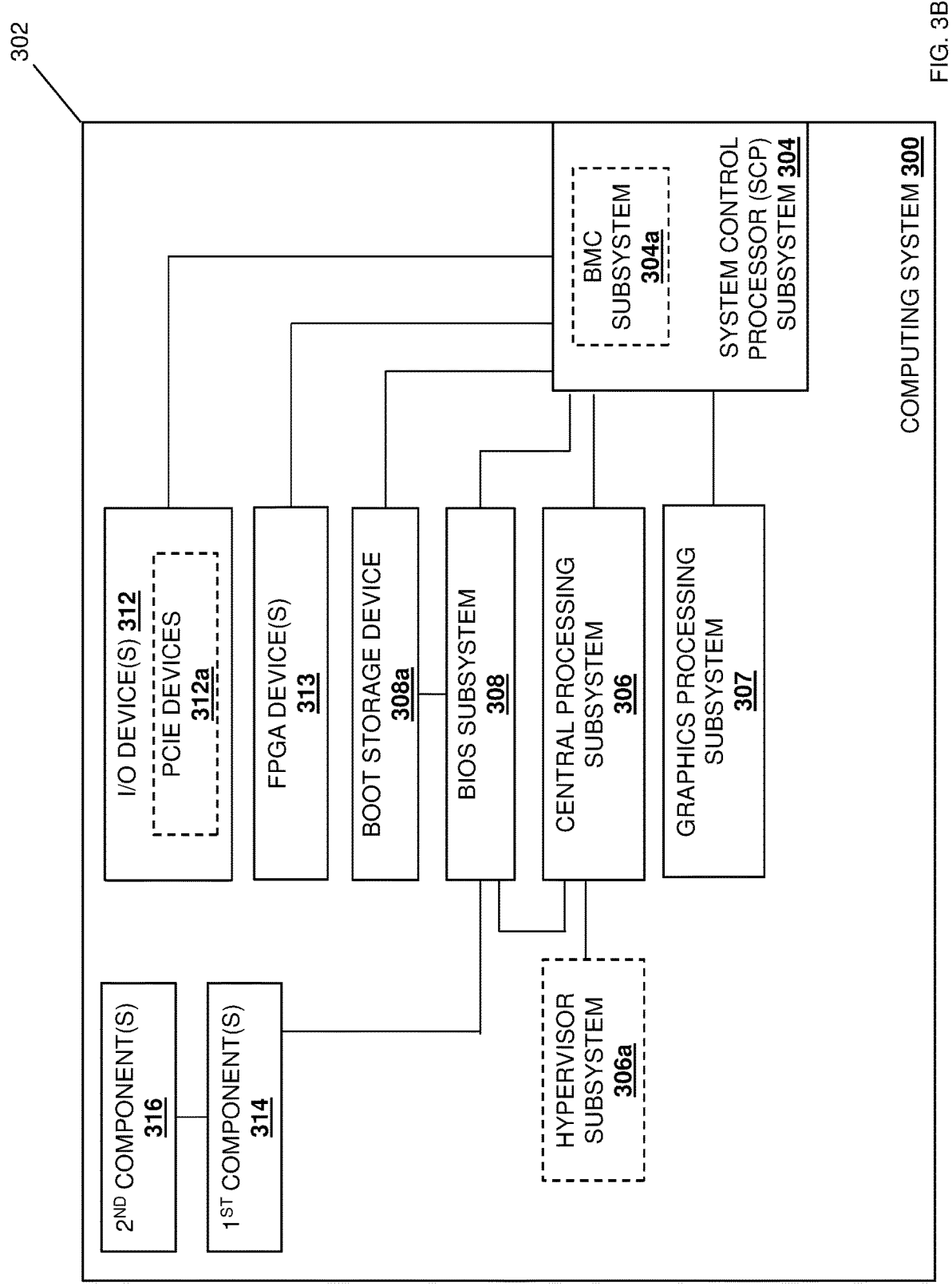
FIG. 3B is a schematic view illustrating an embodiment of a computing system that may be included in the networked system of FIG. 2 and that may utilize the live migration/high availability system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
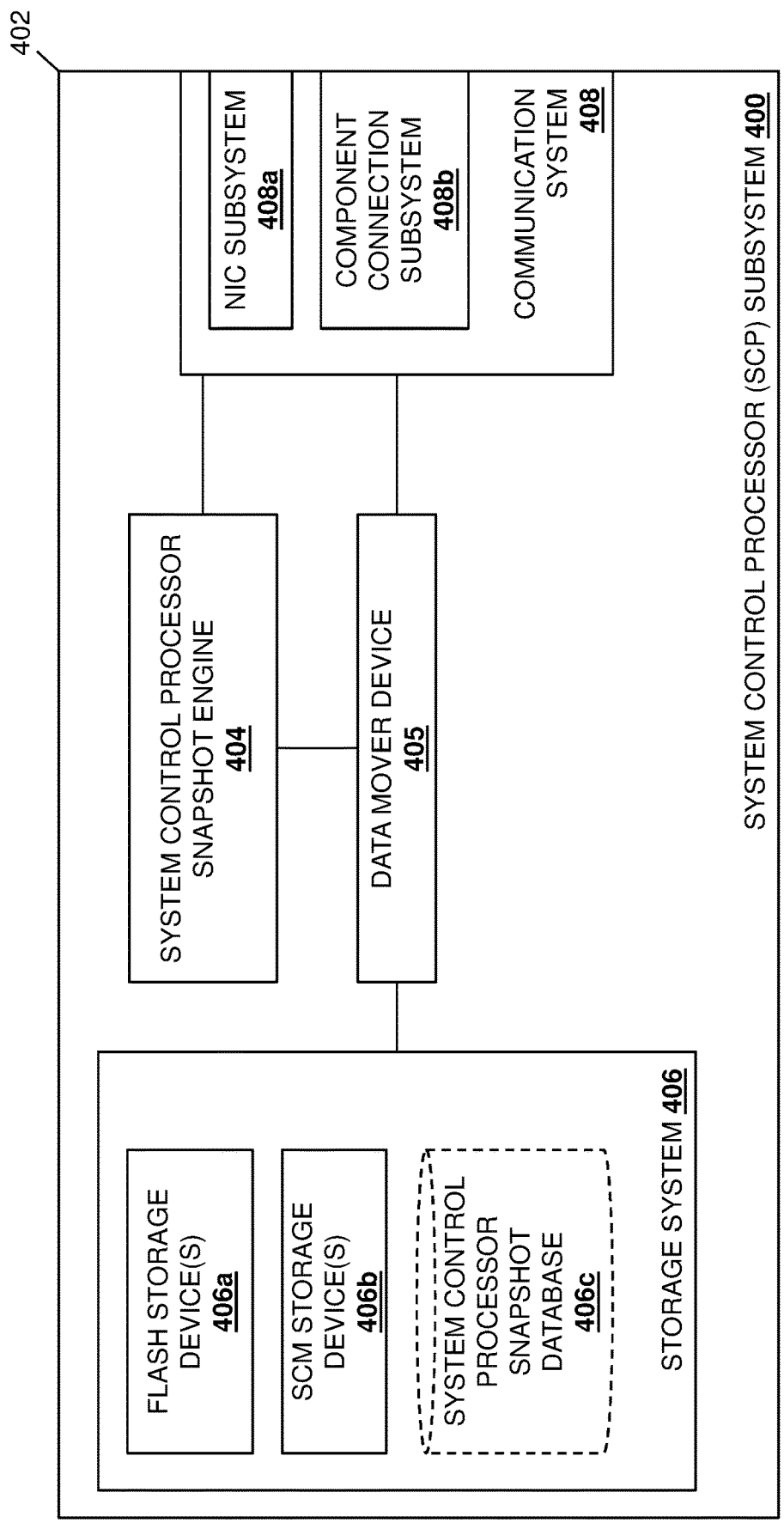
FIG. 4 is a schematic view illustrating an embodiment of an SCP subsystem that may be included in the computing device of FIG. 3A or 3B, and that may provide the live migration/high availability system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP snapshot engine 404 that is configured to perform the functionality of the SCP snapshot engines and/or SCP subsystems discussed below. In a specific example, the SCP processing system providing the SCP snapshot engine 404 may be provided by ARM processor cores in an ARM-based processor, although other processing systems will fall within the scope of the present disclosure as well. In the illustrated embodiment, the chassis 402 also supports a data mover device 405 that is coupled to the SCP snapshot engine 404 (e.g., via a coupling between the data mover device 405 and the SCP processing system) and that, as discussed below, may be utilized to offload data moving operations from the SCP processing system.

The chassis 402 may also support a storage system 406 (e.g., which may include the storage 108 discussed above with reference to FIG. 1, the SCP memory system discussed above, etc.) that is coupled to the data mover device 405 and that, in the illustrated embodiment, includes one or more flash storage device(s) 406a, and one or more Storage Class Memory (SCM) storage devices 406b. However, while a few specific storage devices are illustrated and described below, one of skill in the art in possession of the present disclosure will appreciate that the storage system 406 may include a variety of other storage devices that will fall within the scope of the present disclosure as well. As illustrated, the storage system 406 may provide an SCP snapshot database 406c that may include SCP subsystems settings, as well as any information utilized by the SCP snapshot engine 404 to perform the functionality discussed below.

The chassis 402 may also support a communication system 408 that is coupled to the SCP snapshot engine 404 (e.g., via a coupling between the communication system 408 and the SCP processing system) and the data mover device 405 and that, in the illustrated embodiment, includes a Network Interface Controller (NIC) subsystem 408a (e.g., an Ethernet subsystem) that is configured to connect the SCP subsystem 400 to the network 204 discussed above with reference to FIG. 2, a component connection subsystem 408b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections between the SCP subsystem 400 and the network 204, the central processing subsystem 306, the graphics processing subsystem 307, the BIOS subsystem 308, the boot storage device 308a, the BMC subsystem 310, the I/O device(s) 312, the FPGA device(s) 313, and/or any other components utilized with the computing system 202a/300. For example, the component connection subsystem 408b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP cloning engine 404 and the CxL Root .mem/.cache subsystem discussed above, etc.) and/or component configurations for providing the functionality discussed below while remaining within the scope of the present disclosure as well.

Figure 5A:
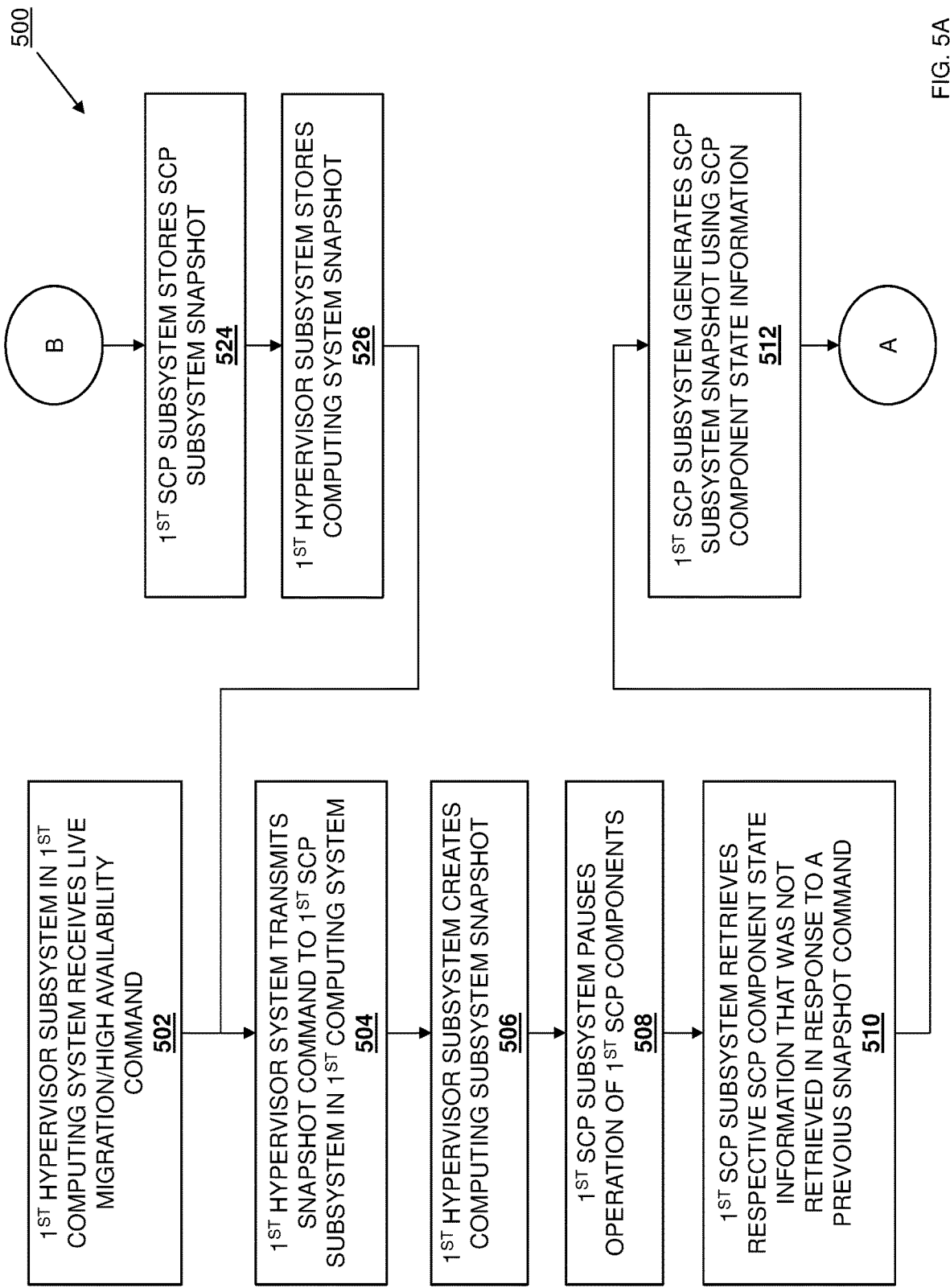
FIG. 5A is a flow chart illustrating an embodiment of a portion of a method for providing live migration/high availability of a computing system.
Figure 5B:
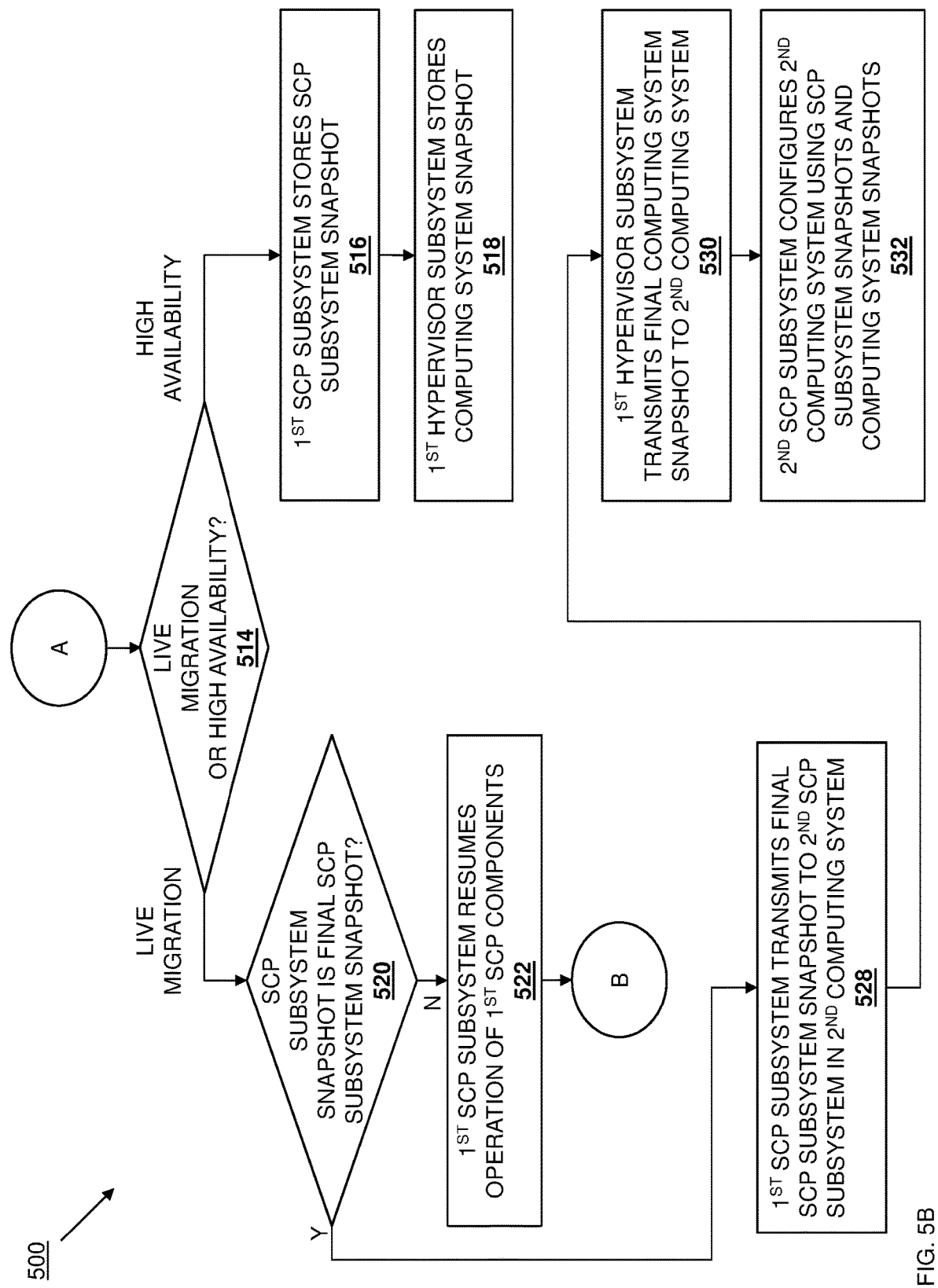
FIG. 5B is a flow chart illustrating an embodiment of a portion of a method for providing live migration/high availability of a computing system.

Referring now to FIGS. 5A and 5B, an embodiment of a method 500 is illustrated for providing live migration/high availability of a computing system that includes a subsystem that performs control operation and stores state information to offload the performance of those control operations and the storage of that state information from that computing system. For example, the live migration/high availability system of the present disclosure includes a first computing system having a first SCP subsystem coupled to first computing system components and a first hypervisor subsystem that provides a first virtual machine. Each time the first SCP subsystem receives snapshot commands from the hypervisor subsystem, it retrieves respective SCP component state information that was not retrieved in response to a previous snapshot command from each first SCP component included in the first SCP subsystem, and uses the respective SCP component state information to generate a respective SCP subsystem snapshot based on that snapshot command. The first SCP subsystem then transmits the SCP subsystem snapshots to a second SCP subsystem in a second computing system, and the second SCP subsystem may use the SCP subsystem snapshots to allow a second hypervisor subsystem on the second computing system to provide a second virtual machine that operates the same as the first virtual machine. As such, a workload being provided by the computing system and its subsystem may be live migrated to a different computing system, or backed up to provide high availability for that workload.

The method 500 begins at block 502 where a first hypervisor subsystem in a first computing system receives a live migration/high availability command. In an embodiment, at or prior to block 502, the hypervisor subsystem 306a may operate with the SCP subsystem 304 to use the computing system 202a/300 to provide a virtual machine that may perform one or more workloads, and a network administrator or other user may wish to live migrate that virtual machine to one or more other computing systems (e.g., the computing system 202b in the examples above) in order to perform the one or more workloads on those other computing systems, or may wish to provide high availability for (or otherwise back up) that virtual machine on one or more other computing systems (e.g., the computing system 202b in the examples above) in order to provide for the performance of the one or more workloads on those other computing systems in the event of the unavailability (e.g., failure) of the computing system 202/300. However, while live migration/high availability operations associated with virtual machines and workloads are described, one of skill in the art in possession of the present disclosure will appreciate that the live migration/high availability operations may be performed to migrate and/or backup other computing system functionality while remaining within the scope of the present disclosure as well.

Figure 6A:
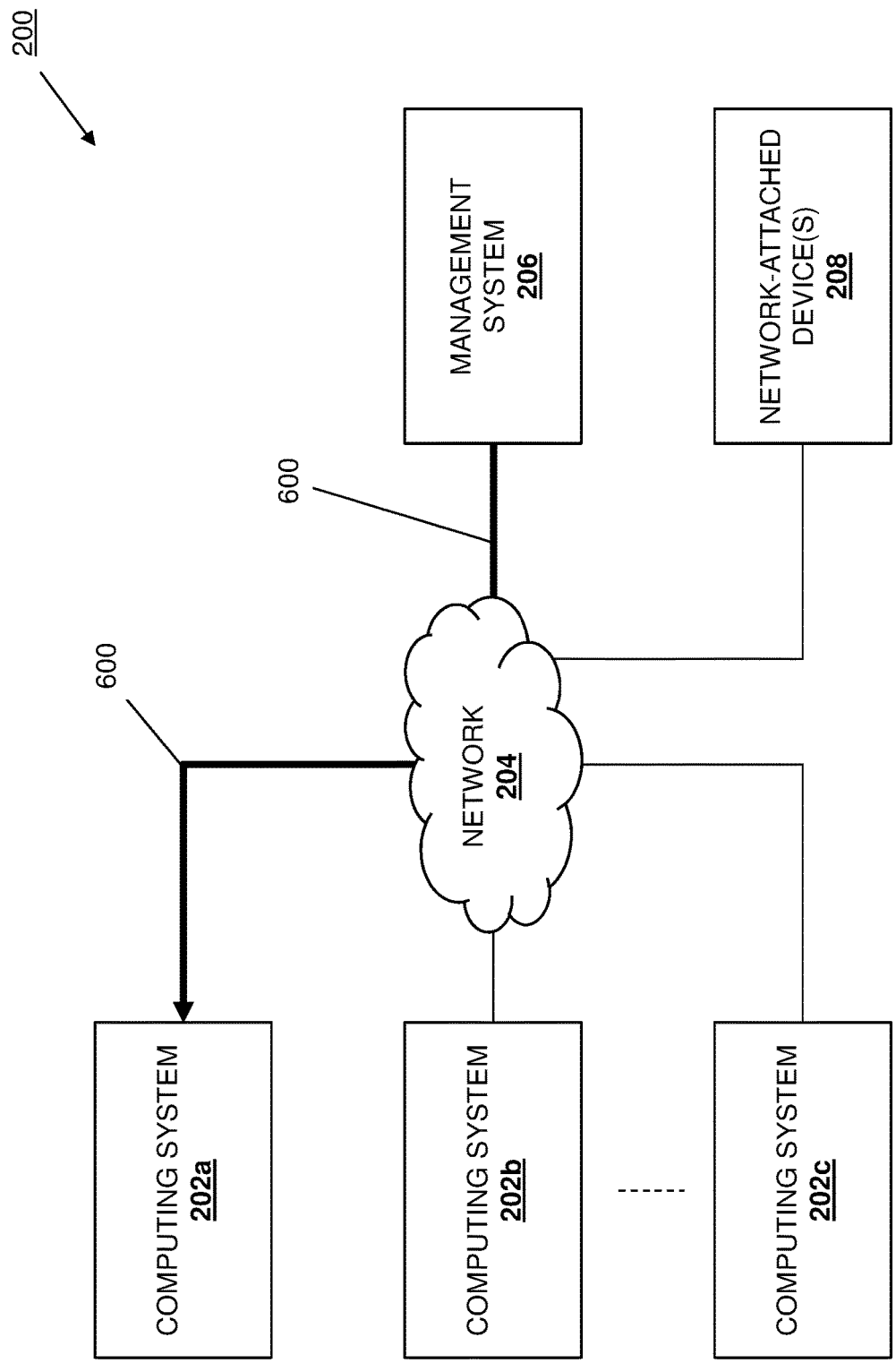
FIG. 6A is a schematic view illustrating an embodiment of the networked system of FIG. 2 operating during the method of FIGS. 5A and 5B.
Figure 6B:
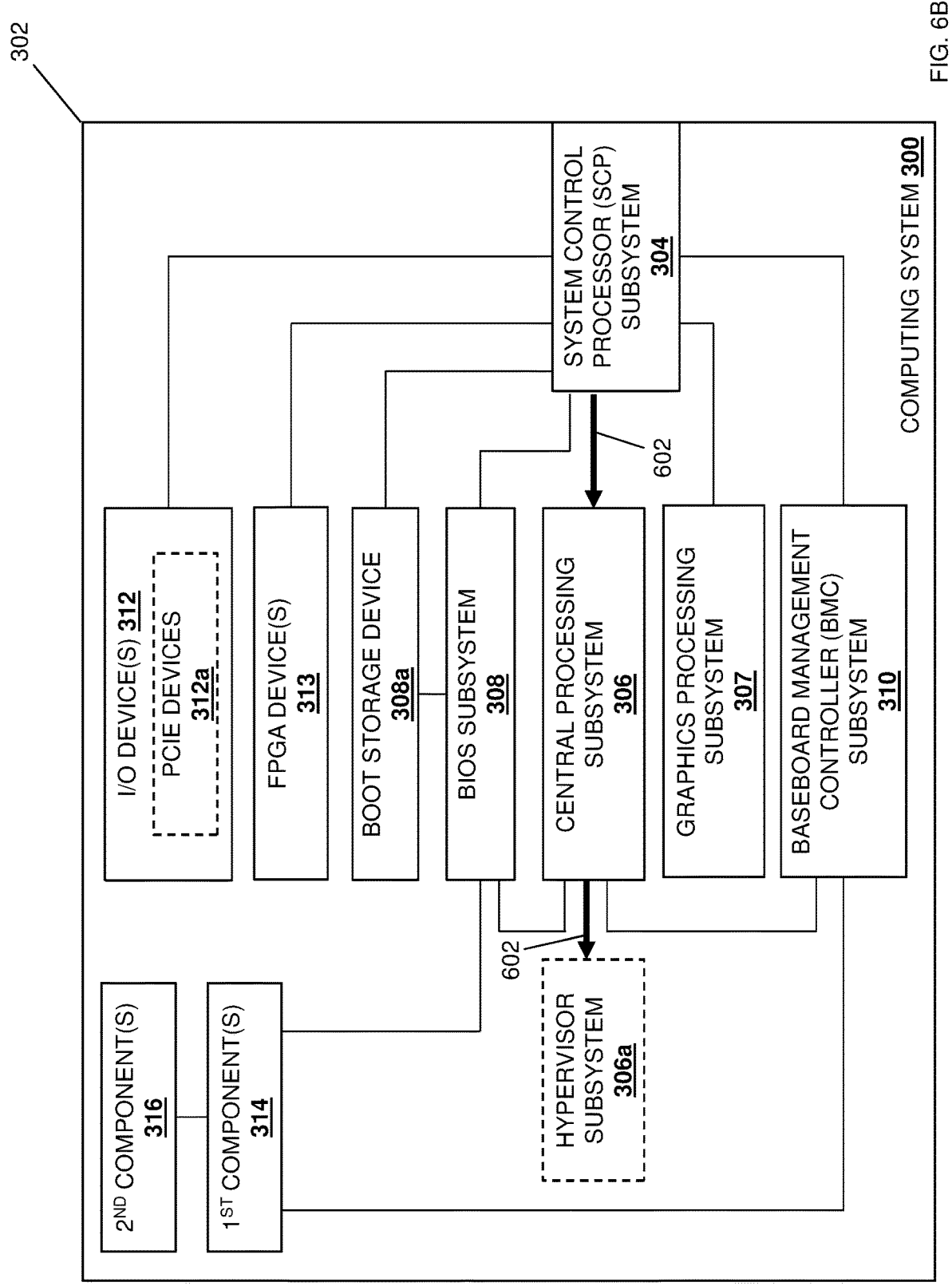
FIG. 6B is a schematic view illustrating an embodiment of the computing system of FIG. 3A operating during the method of FIGS. 5A and 5B.

With reference to FIG. 6A, in an embodiment of block 502, the network administrator or other user may provide a command on the management system 206 to perform live migration operations or high availability operations in association with the computing system 202a and, in response, the management system 206 may perform live migration/high availability command transmission operations 600 that include the generation and transmission of a live migration command or a high availability command via the network to the computing system 202a. As illustrated in FIG. 6B, at block 502, the hypervisor subsystem 306a being provided by the central processing subsystem 306 in the computing system 300 may then perform live migration/high availability command receiving operations 602 to receive the live migration command or high availability command (e.g., in response to the central processing subsystem 306 receiving that live migration command or high availability command via the communication SCP subsystem 304 as illustrated in FIG. 6B). However, while a specific initiation of live migration/high availability operations has been described, one of skill in the art in possession of the present disclosure will appreciate that live migration/high availability operations may be initiated in a variety of manners that will fall within the scope of the present disclosure as well.

The method 500 then proceeds to block 504 where the first hypervisor subsystem transmits a snapshot command to a first SCP subsystem in the first computing system. As illustrated in FIG. 6C, in an embodiment of block 504 and in response to receiving the live migration command or high availability command, the hypervisor subsystem 306a may perform SCP subsystem snapshot command operations 604 to generate and transmit an SCP subsystem snapshot command (e.g., via the central processing subsystem 306) to the SCP subsystem 304. As discussed in further detail below, in response to receiving the live migration command or high availability command, the hypervisor subsystem 306a may also begin computing system snapshot operations to generate a computing system snapshot for the computing system 202a/300, while performing the SCP subsystem snapshot command operations 604 to instruct the SCP subsystem 304 to begin SCP subsystem snapshot operations to generate an SCP subsystem snapshot for the SCP subsystem 304, which results in the creation of the computing system snapshot and SCP subsystem snapshot that are configured for use in configuring another computing system/SCP subsystem to provide a virtual machine that performs workload(s) in the same manner as the virtual machine/workload(s) being provided by the hypervisor subsystem 306a/SCP subsystem 304 in the computing system 202a/300.

In a specific example, the SCP subsystem 304 may include an Application Programming Interface (API) that may be utilized by the hypervisor subsystem 306a in order to initiate the SCP subsystem snapshot operations discussed below, as well as monitor the status of the SCP subsystem snapshot operations discussed below, copy and coordinate the migration of the state of the SCP subsystem 304 along with the state of the computing system 202a (e.g., the central processing system state as discussed below), copy and coordinate the syncing of SCP subsystem high availability information for the SCP subsystem 304 along with high availability information for the computing system 202a (e.g., the central processing system state as discussed below), and/or perform any of the other live migration/high availability operations discussed below. However, while the use of an API is described as enabling the commands between the hypervisor subsystem 306a and the SPC subsystem 304, one of skill in the art in possession of the present disclosure will appreciate that the coordination of computing system/SCP subsystem snapshots discussed below may be enabled in other manners while remaining within the scope of the present disclosure as well.

Figure 6D:
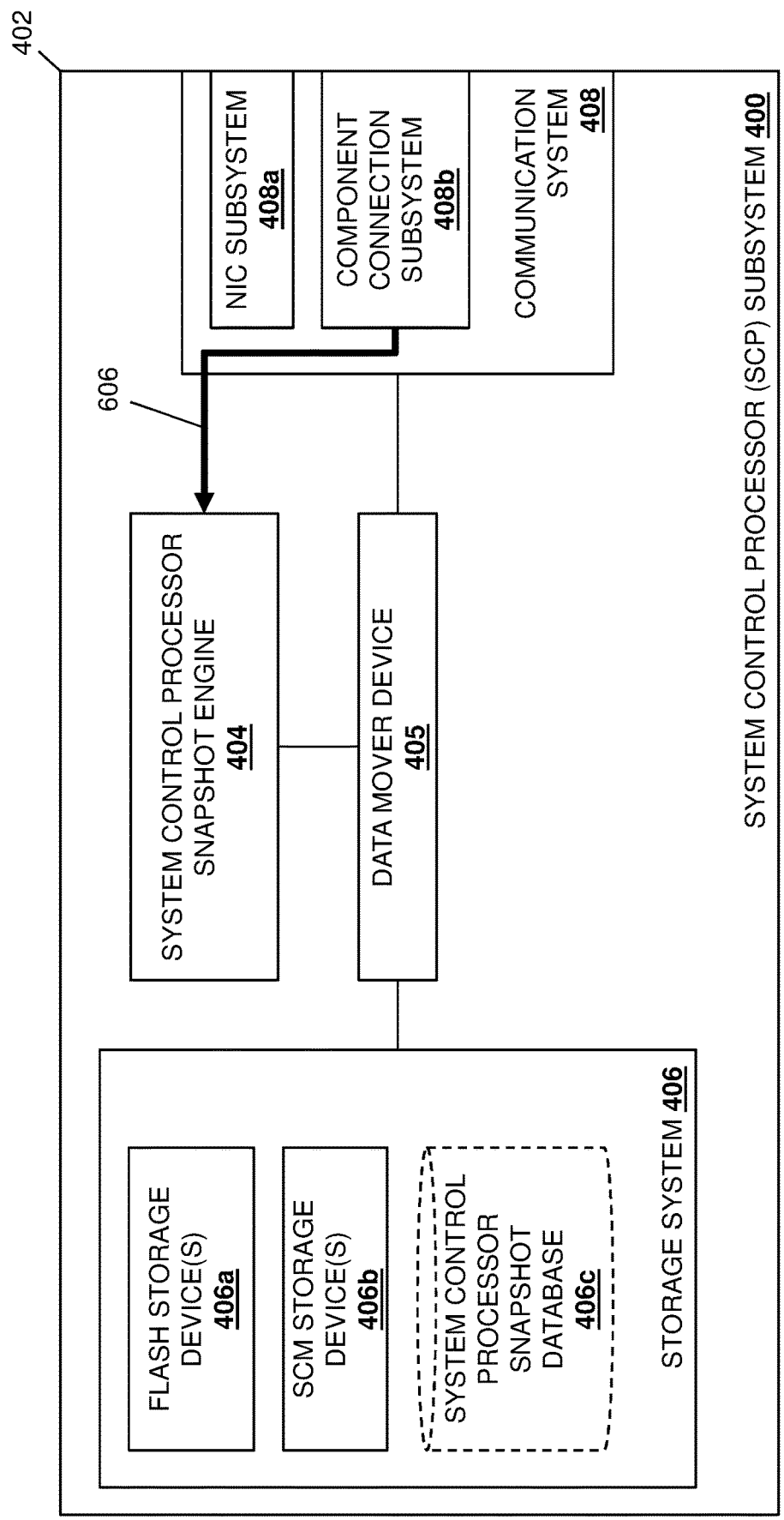
FIG. 6D is a schematic view illustrating an embodiment of the SCP subsystem of FIG. 4 operating during the method of FIGS. 5A and 5B.

Thus, as illustrated in FIG. 6D, at block 506 the SCP snapshot engine 404 in the SCP subsystem 304/400 may perform SCP subsystem snapshot command receiving operations 606 to receive the SCP subsystem snapshot command via the component connection subsystem 408b in the communication system 408 of the SCP subsystem 304/400. In several embodiments, the SCP subsystem 304 and/or the management system 206 (e.g., an SCP manager) may control any of the SCP subsystem snapshot operations and/or copying of SCP subsystem state information discussed below, and thus may authenticate or validate any SCP subsystem snapshot operation commands received from the hypervisor subsystem 306a (and/or other applications) running in the computing system 202a (e.g., running on a Bare Metal Server (BMS)), as well as reject such requests if authentication, validation, and/or other security checks fail.

Figure 6E:
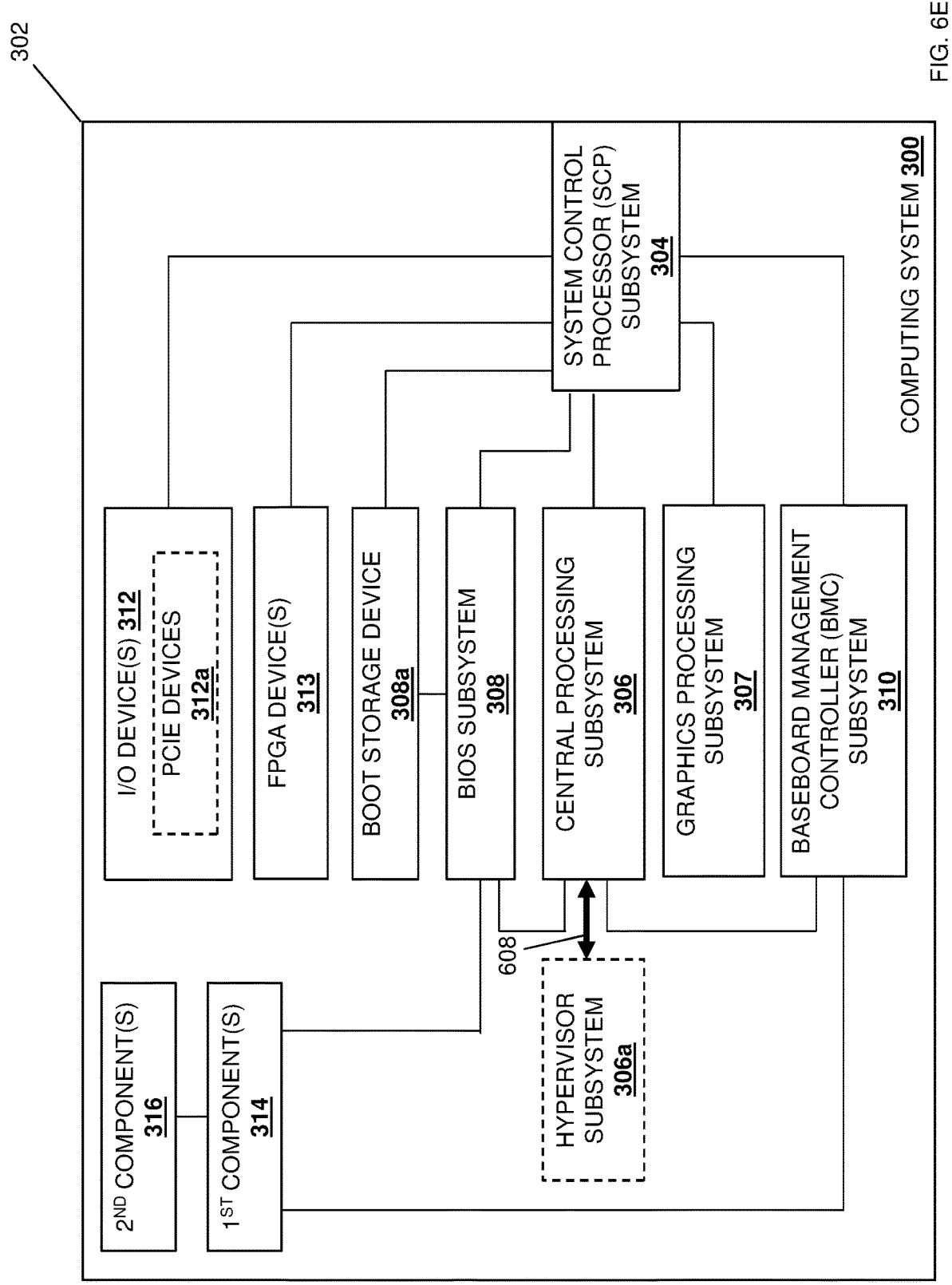
FIG. 6E is a schematic view illustrating an embodiment of the computing system of FIG. 3A operating during the method of FIGS. 5A and 5B.

The method 500 then proceeds to block 506 where the first hypervisor subsystem creates a computing system snapshot. With reference to FIG. 6E, in an embodiment of block 506, the hypervisor subsystem 306a may perform computing system snapshot creation operations 608 in order to create a computing system snapshot of the computing system 202a/300, which one of skill in the art in possession of the present disclosure will recognize may include pausing the virtual machine being provided by the hypervisor subsystem 306a using the computing system 202a/300, collecting central processing subsystem state information from components in the central processing subsystem 306 (e.g., Central Processing Unit (CPU) state information, CPU memory state information, register values and/or other register state data, and/or other central processing subsystem state information that would be apparent to one of skill in the art in possession of the present disclosure) in the computing system 202a/300, resuming the virtual machine being provided by the hypervisor subsystem 306a using the computing system 202a/300, and generating a computing system snapshot using that central processing subsystem state information.

However, while specific operations for creating a computing system snapshot for the computing system 202a/300 are described, one of skill in the art in possession of the present disclosure will appreciate that other operations may be performed to generate the computing system snapshot discussed below while remaining within the scope of the present disclosure as well. Furthermore, one of skill in the art in possession of the present disclosure will appreciate from the discussion below that, in many embodiments, the computing system snapshot creation operations 608 discussed above may be performed at the same time as at least some of the SCP subsystem snapshot operations that are discussed below as being performed by the SCP subsystem 304 while remaining within the scope of the present disclosure as well.

The method 500 then proceeds to block 508 where the first SCP subsystem pauses operation of first SCP components. In an embodiment, at block 508 and in response to receiving the SCP subsystem snapshot command from the hypervisor subsystem 306a as discussed above, the SCP snapshot engine 404 in the SCP subsystem 304/400 may operate to pause the operation of one or more SCP components that may be included in the SCP subsystem 304/400 and/or coupled to the SCP subsystem 304/400. For example, at block 508, the SCP snapshot engine 404 may perform any of a variety of component pausing operations that one of skill in the art in possession of the present disclosure will recognize may cause the flash storage device(s) 406a, the SCM storage device(s) 406b, the NIC subsystem 408a, the graphics processing subsystem 307, the BIOS subsystem 308, the boot storage device 308a, the BMC subsystem 310, the I/O device(s) 312, the FPGA device(s) 313, the first components 314, the second components 316, and/or any other components that are included in or coupled to the SCP snapshot engine 404, to pause their operations such that, for example, no new state information is generated by those components while they are paused. As will be appreciated by one of skill in the art in possession of the present disclosure, the pausing of the SCP components at block 508 may coincide with the pausing the virtual machine being provided by the hypervisor subsystem 306a using the computing system 202a/300 discussed above during the generation of the computing system snapshot at block 506.

Figure 6F:
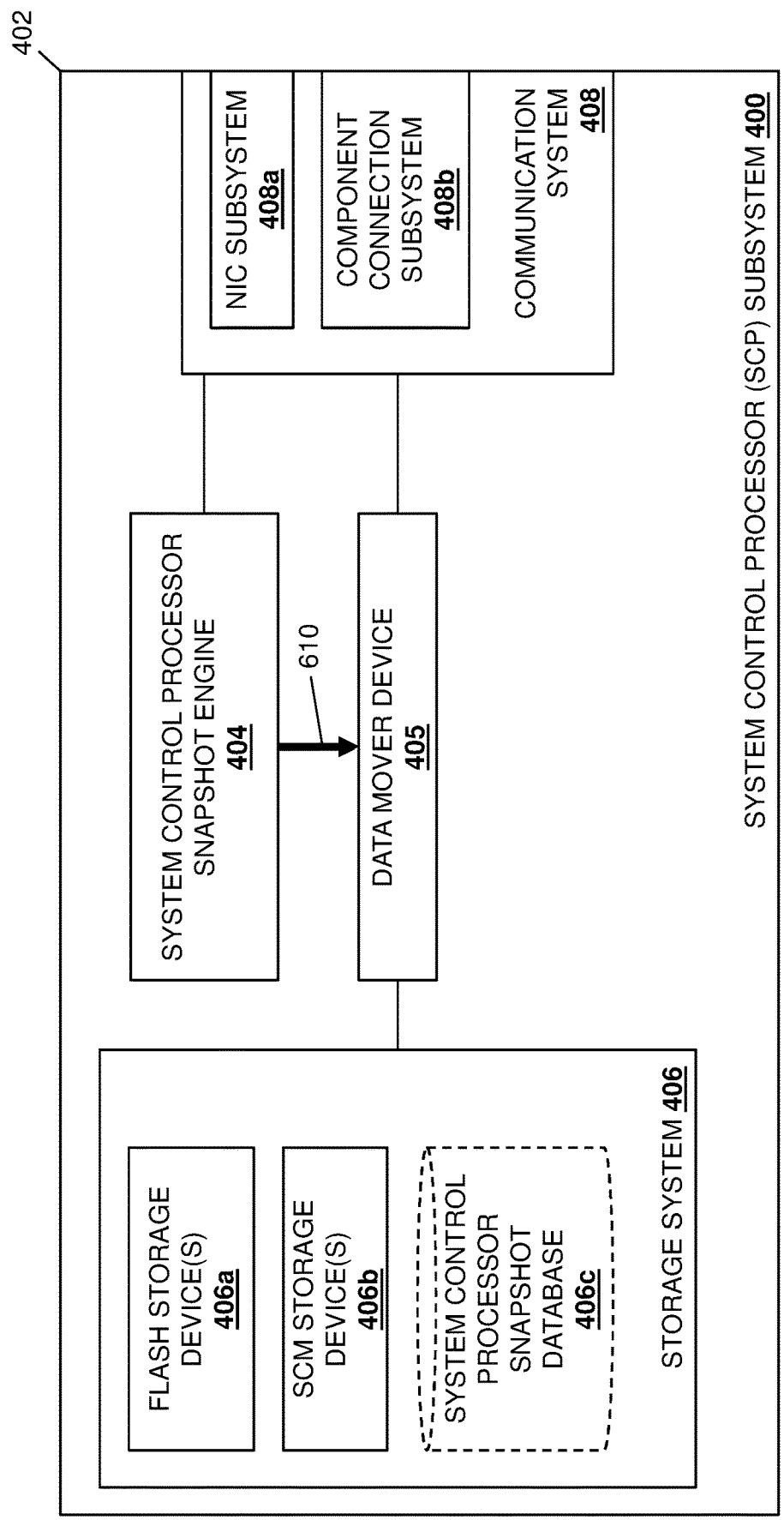
FIG. 6F is a schematic view illustrating an embodiment of the SCP subsystem of FIG. 4 operating during the method of FIGS. 5A and 5B.
Figure 6G:
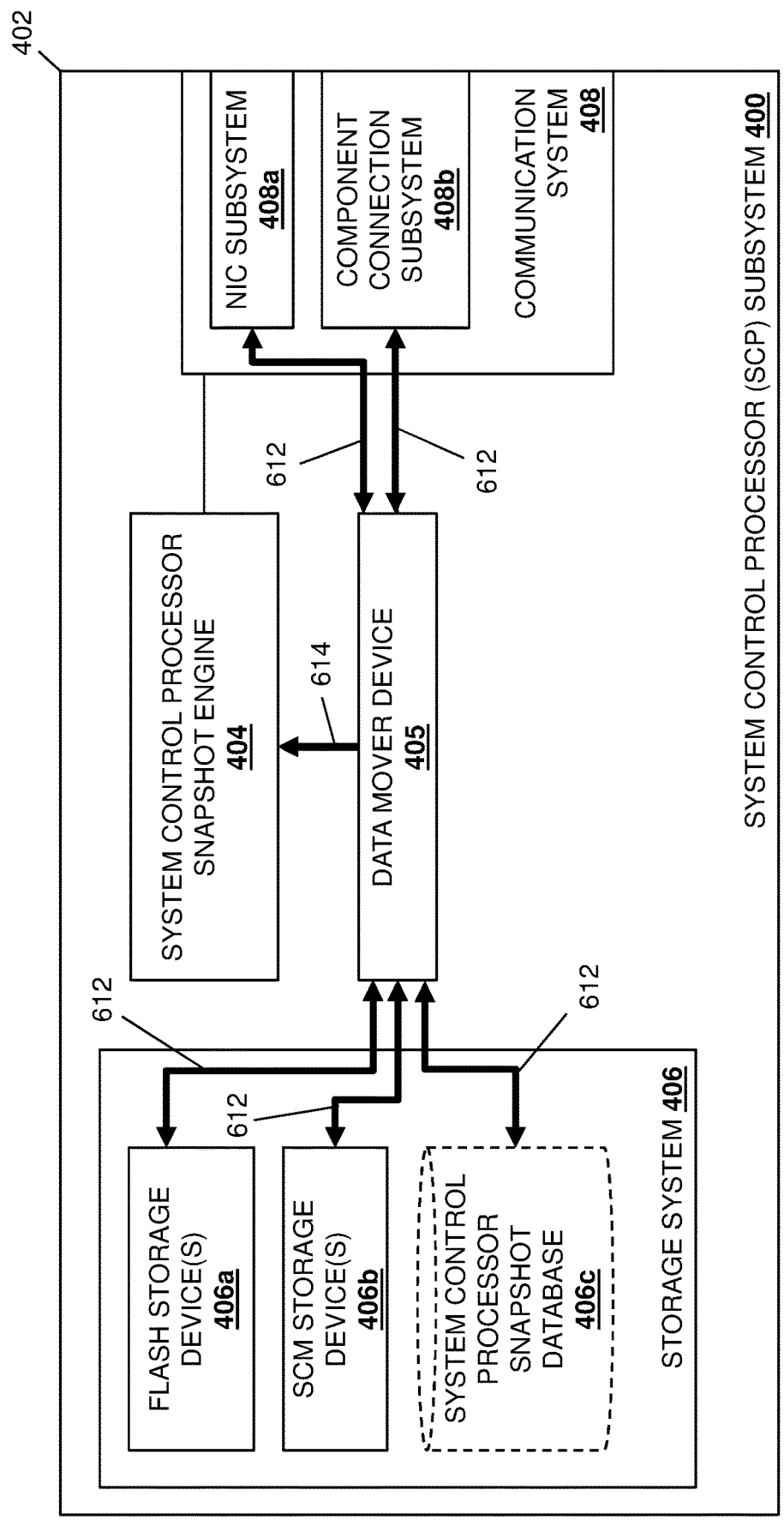
FIG. 6G is a schematic view illustrating an embodiment of the SCP subsystem of FIG. 4 operating during the method of FIGS. 5A and 5B.

The method 500 then proceeds to block 510 where the first SCP subsystem retrieves respective SCP component state information that was not retrieved in response to a previous snapshot command. As will be appreciated by one of skill in the art in possession of the present disclosure, in this specific example of a first iteration of the method 500, the SCP component state information is being retrieved from the SCP components in response to a first snapshot command, and thus no previous SCP subsystem snapshot command was received, and the SCP component state information being retrieved from each SCP component may be all of the SCP component state information currently associated with that SCP component. With reference to FIG. 6F and in an embodiment of block 510 and subsequent to the pausing of the SCP components at block 508, the SCP snapshot engine 404 in the SCP subsystem 304/400 may perform SCP component state information retrieval command transmission operations 610 that include transmitting SCP component state information retrieval commands to the data mover device 405 to retrieve SCP component state information from a plurality of components included in and/or coupled to the SCP subsystem 304/400. Furthermore, FIG. 6G illustrates how, in response to executing the SCP component state information retrieval commands to retrieve SCP component state information from each of a plurality of SCP components, the data mover device 405 may perform SCP component state information storage operations 614 to store that SCP component state information in an SCP memory subsystem (e.g., an internal buffer device) that, in the illustrated example, is included in the SCP snapshot engine 404.

For example, following the pausing of the SCP components, the SCP snapshot engine 404 in the SCP subsystem 304/400 may select an SCP component for SCP component state information retrieval, transmit one or more SCP component state information retrieval commands to the data mover device 405 in order to configure the data mover device to retrieve SCP component state information from that SCP component and copy that SCP component state information to the SCP memory subsystem included in the SCP subsystem 304/400 as discussed above. As will be appreciated by one of skill in the art in possession of the present disclosure, following the copying of SCP component state information for any SCP component to the SCP memory subsystem, the SCP snapshot engine 404 in the SCP subsystem 304/400 may select another SCP component and configure the data mover device 405 to copy the SCP component state information for that SCP component to the SCP memory subsystem included in the SCP subsystem 304/400, and repeat that process until the SCP state information for all of the SCP components has been copied to the SCP memory subsystem. However, while a specific technique for copying SCP component state information from a plurality of SCP components has been described, one of skill in the art in possession of the present disclosure will recognize that SCP component state information may be captured from plurality of SCP components in a variety of manners that will fall within the scope of the present disclosure as well.

As such, with reference to FIG. 6F and in an embodiment of block 510, the data mover device 405 may receive the SCP component state information retrieval command(s) from the SCP snapshot engine 404 and, in response, may operate to execute the SCP component state information retrieval command(s) to perform SCP component state information retrieval operations 612 that may include, for example, retrieving flash storage device state information from the flash storage device(s) 406a included in the storage system 406, retrieving SCM storage device state information from the SCM storage device(s) 406b included in the storage system 406, retrieving SCP snapshot database state information from the SCP snapshot database 406c included in the storage system 406, retrieving NIC subsystem state information from the NIC subsystem 408a, retrieving graphics processing subsystem state information from the graphics processing subsystem 307 via the component connection subsystem 408b, retrieving BIOS subsystem state information from the BIOS subsystem 308 via the component connection subsystem 408b, retrieving boot storage device state information from the boot storage device 308a via the component connection subsystem 408b, retrieving BMC subsystem state information from the BMC subsystem 310 via the component connection subsystem 408b, retrieving I/O device state information from the I/O device(s) 312 via the component connection subsystem 408b, retrieving FPGA device state information from the FPGA device(s) 313 via the component connection subsystem 408b, and/or retrieving computing system component state information from any other computing system component that would be apparent to one of skill in the art in possession of the present disclosure. Furthermore, one of skill in the art in possession of the present disclosure will recognize that the SCP component state information retrieval operations 612 may include retrieving state information from the network-attached device(s) 208 while remaining within the scope of the present disclosure as well.

In a specific example, the flash storage device state information retrieved from the flash storage device(s) 406a may include any data that is stored on those flash storage device(s) 406a. In another specific example, the SCM storage device state information retrieved from the SCM storage device(s) 406b may include any data that is stored on those SCM storage device(s) 406b. In yet another specific example, the SCP snapshot database state information retrieved from the SCP snapshot database 406c may include any SCP settings that are stored in the SCP snapshot database 406c. Furthermore, one of skill in the art in possession of the present disclosure will recognize that the SCP component state information retrieved at block 510 may include programming instructions provided with the SCP processing system that provides the SCP snapshot engine 404, data stored on the SCP memory system that provides the SCP snapshot engine 404, and/or any other state information that one of skill in the art in possession of the present disclosure would recognize may be produced by, provided for, and/or otherwise associated with the SCP subsystem 304/400, and that may be utilized to provide for the live migration/high availability operations discussed in further detail below.

In a yet another specific example, the graphics processing subsystem state information retrieved from the graphics processing subsystem 307 may include any data that is stored on a graphics processing memory in the graphics processing subsystem 307 (which may be accessible to the SCP subsystem 304/400 because the SCP subsystem 304/400 provides the host for the graphics processing system 307, as discussed above). In yet another specific example, the BIOS subsystem state information retrieved from the BIOS subsystem 308 may include any BIOS settings that are provided in the BIOS subsystem 308. In yet another specific example, the boot device storage state information retrieved from the boot storage device 308a may include a boot image that is stored on the boot storage device 308a. In yet another specific example, the BMC subsystem state information retrieved from the BMC subsystem 310 may include any BMC settings included in the BMC subsystem 310 and/or data stored in a local memory in the BMC subsystem 310. In yet another specific example, the I/O device(s) 312 may include NVMe storage devices and the I/O device state information retrieved from the I/O device(s) may include any data stored on the NVMe storage devices. In yet another specific example, the FPGA device state information retrieved from the FPGA device(s) 313 may include FPGA programming (e.g., FPGA bitstream(s)) provided in the FPGA device(s) 313. However, while specific examples of SCP components and SCP component state information are provided above, one of skill in the art in possession of the present disclosure will appreciate that a variety of SCP component and SCP component state information will fall within the scope of the present disclosure as well.

The method 500 then proceeds to block 512 where the first SCP subsystem generates an SCP subsystem snapshot using the SCP component state information. In an embodiment, at block 512 and following the data mover device 405 retrieving and storing the SCP component state information for each of the SCP components in the SCP memory subsystem as discussed above, the SCP snapshot engine 404 in the SCP subsystem 304/400 may operate to generate an SCP subsystem snapshot using that SCP component state information. As will be appreciated by one of skill in the art in possession of the present disclosure, the SCP snapshot engine 404 in the SCP subsystem 304/400 may utilize a variety of snapshot generation techniques on the SCP component state information collected by the data mover device 405 at block 510 in order to generate an SCP subsystem snapshot that is configured for use in configuring an SCP subsystem to operate the same as the SCP subsystem 304/400 in the computing system 202a/300 operated at the time that SCP component state information was collected. For example, the data mover device 405 in a "host" SCP subsystem may store state information locally so that a Virtual Machine (VM) may be unpaused as soon as an SCP subsystem snapshot is generated, and the SCP snapshot engine 404 may generate that SCP subsystem snapshot using the various state information from each of a plurality of devices (e.g., to provide an SCP subsystem snapshot image), and transmit that SCP subsystem snapshot to a "target" SCP subsystem (e.g., after the VM in the host SCP subsystem is unpaused as discussed above).

In some embodiments, subsequent to generating the SCP subsystem snapshot, the SCP snapshot engine 404 may notify the hypervisor subsystem 306a (or other application that requested the SCP snapshot operations) that the SCP subsystem snapshot command has been completed, and may provide the hypervisor subsystem 306a (or other application that requested the SCP snapshot operations) a size of the SCP subsystem snapshot, a copy of the SCP subsystem snapshot, and/or any other snapshot information that would be apparent to one of skill in the art in possession of the present disclosure.

The method 500 then proceeds to decision block 514 where the method 500 proceeds depending on whether live migration operations or high availability operations are being performed. As discussed above and as will be appreciated by one of skill in the art in possession of the present disclosure, live migration operations may provide for the copying and migration of a virtual machine being provided by the hypervisor subsystem 306a on the computing system 202a/300 to the computing system 202b such that the memory, storage, and networking connectivity of that virtual machine being provided by the hypervisor subsystem 306a on the computing system 202a/300 is provided on the computing system 202b without any associated disconnection of a client, application(s), and/or workloads being provided by the virtual machine being provided by the hypervisor subsystem 306a on the computing system 202a/300. As also discussed above and as will be appreciated by one of skill in the art in possession of the present disclosure, high availability operations are similar to live migration operations and are performed in order to ensure optimal performance (e.g., uptime) of a virtual machine being provided by the hypervisor subsystem 306a on the computing system 202a/300 by, for example, maintaining a copy of a virtual machine being provided by the hypervisor subsystem 306a on the computing system 202a/300 so that the virtual machine being provided by the hypervisor subsystem 306a on the computing system 202a/300 may be quickly provided on the computing system 202b in the event of the unavailability (e.g., failure) of the computing system 202a/300. Thus, one of skill in the art in possession of the present disclosure will recognize that the method 500 may proceed differently depending on which operations are being performed.

Figure 6I:
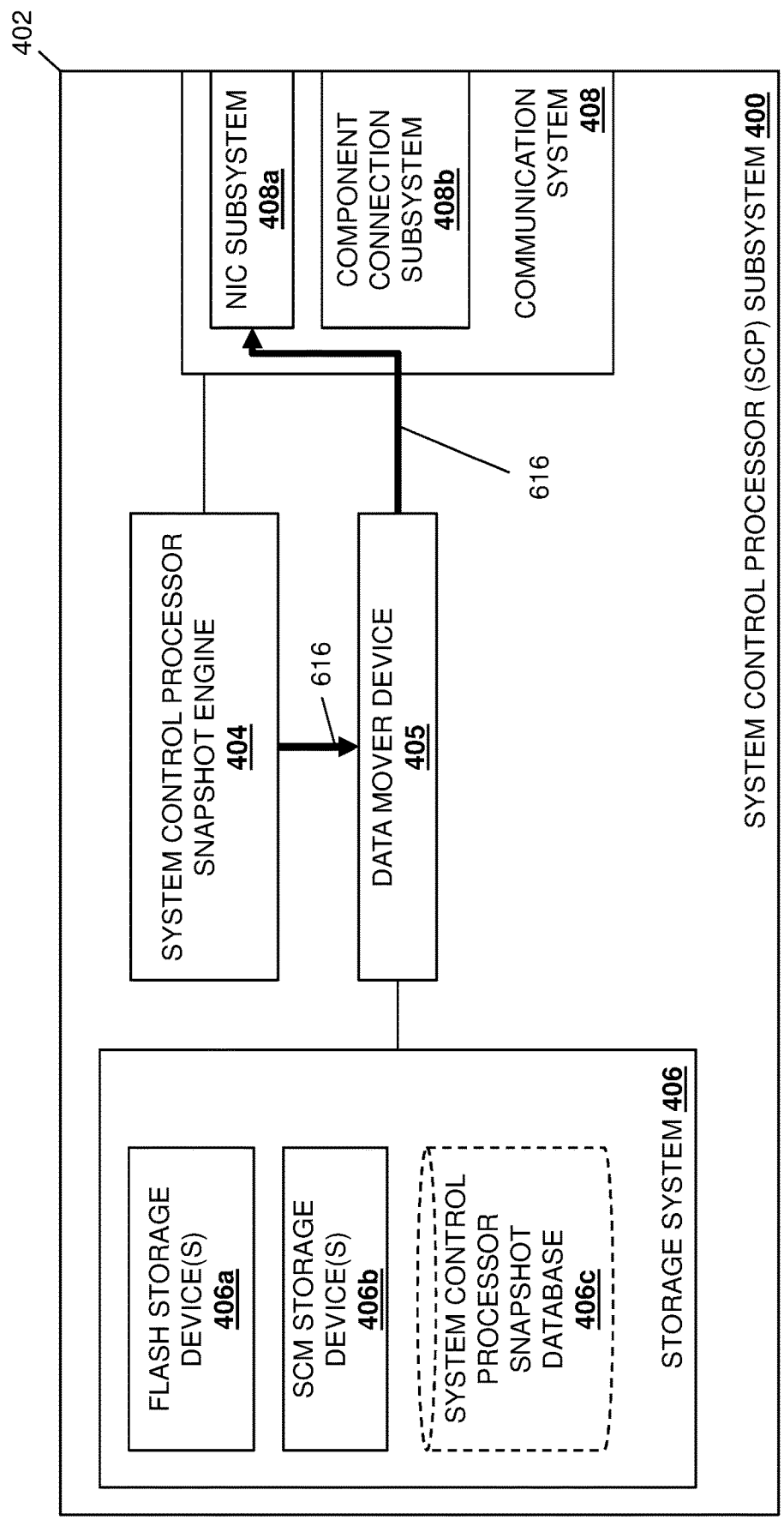
FIG. 6I is a schematic view illustrating an embodiment of the SCP subsystem of FIG. 4 operating during the method of FIGS. 5A and 5B.
Figure 6J:
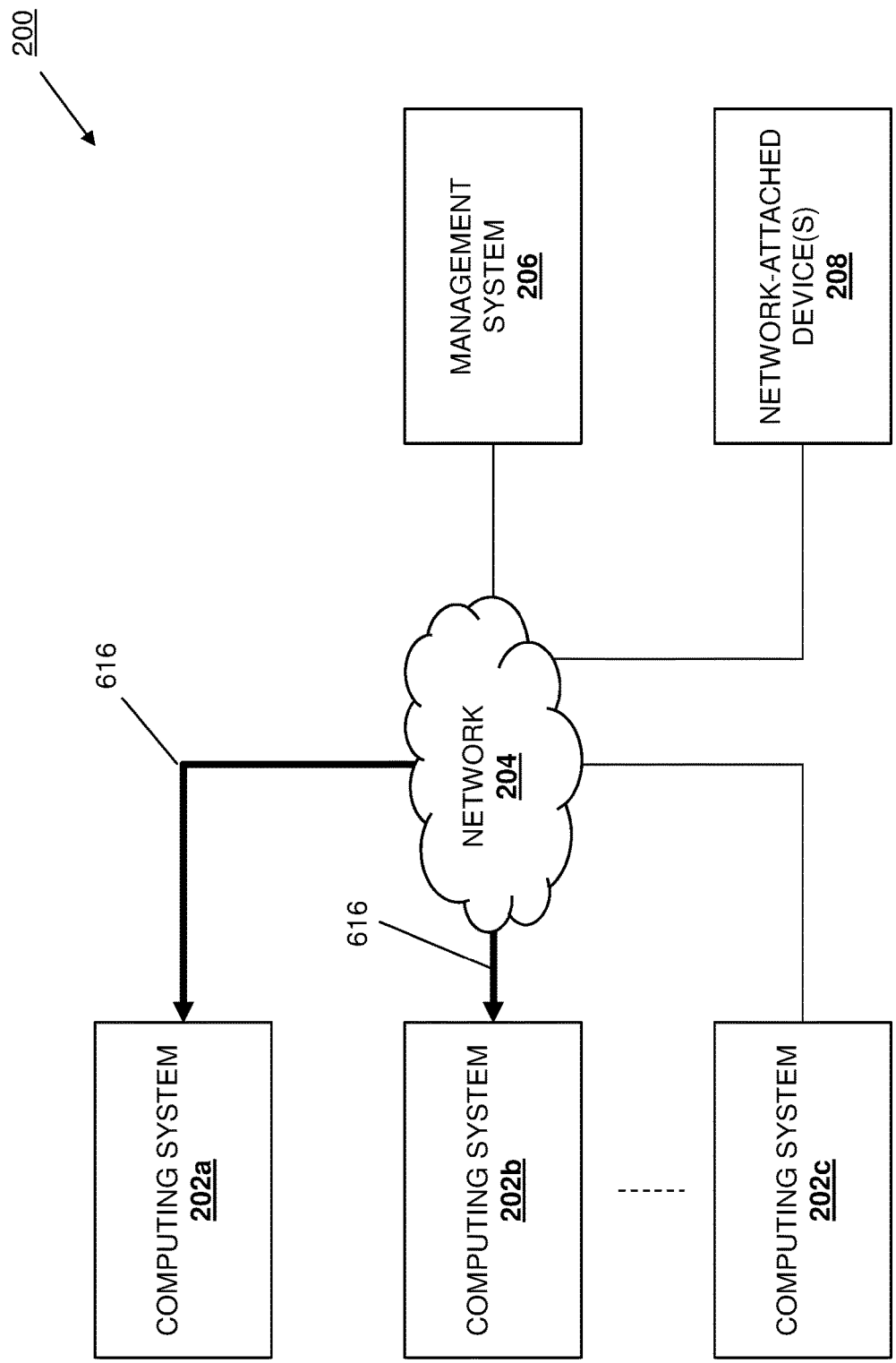
FIG. 6J is a schematic view illustrating an embodiment of the networked system of FIG. 2 operating during the method of FIGS. 5A and 5B.
Figure 6K:
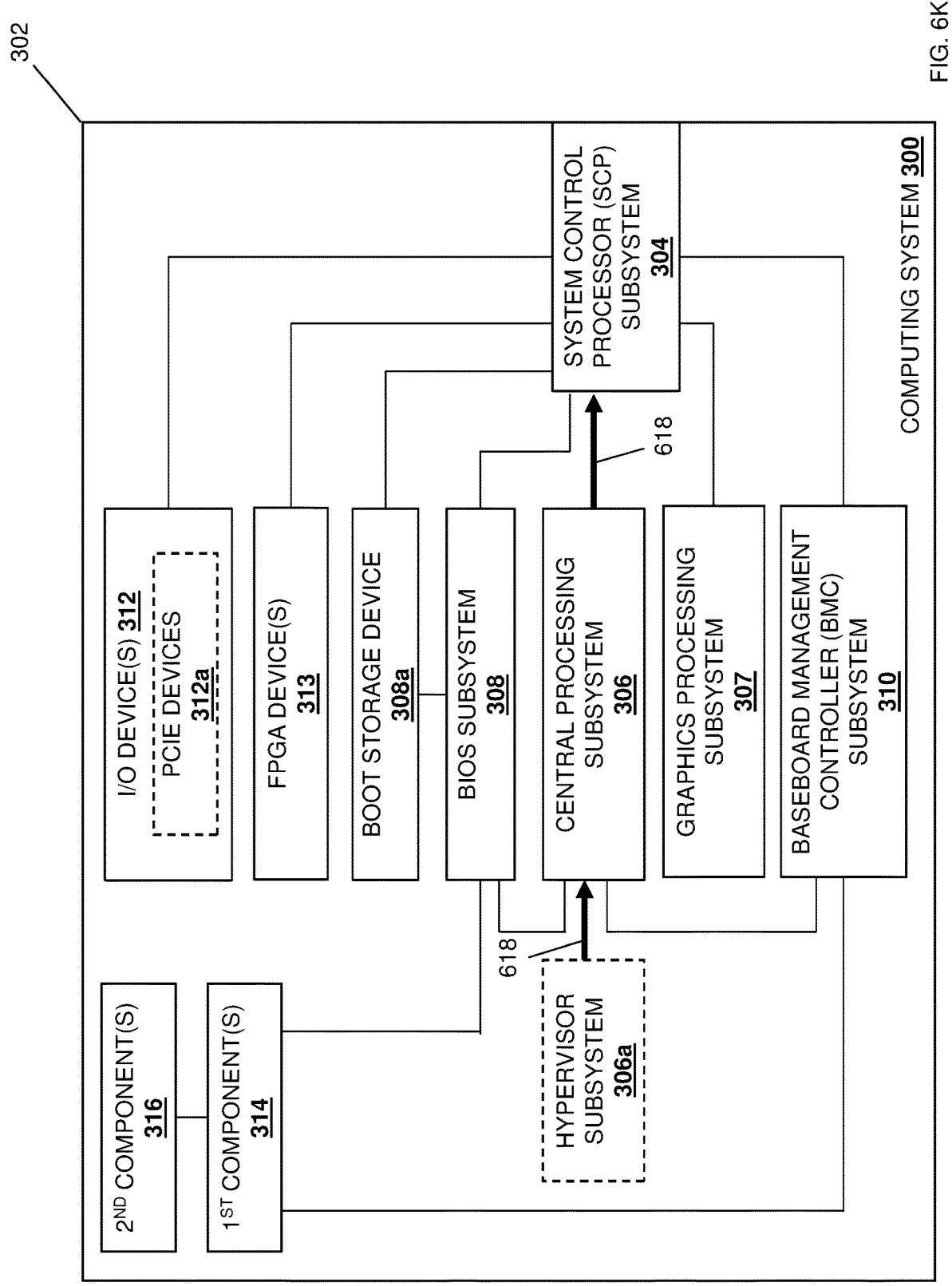
FIG. 6K is a schematic view illustrating an embodiment of the computing system of FIG. 3A operating during the method of FIGS. 5A and 5B.
Figure 6L:
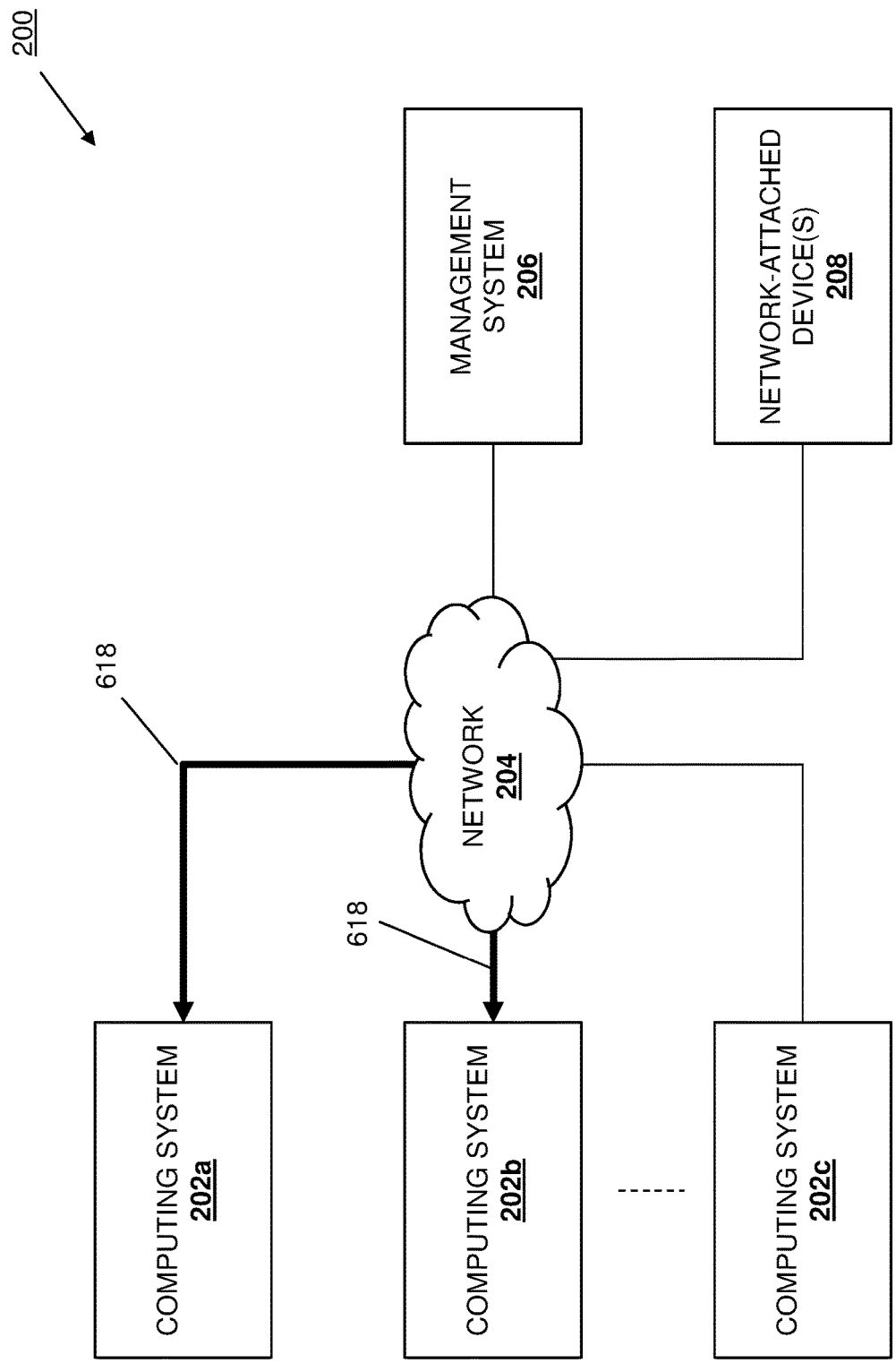
FIG. 6L is a schematic view illustrating an embodiment of the networked system of FIG. 2 operating during the method of FIGS. 5A and 5B.

If, at decision block 514, high availability operations are being performed, the method 500 proceeds to block 516 where the first SCP subsystem stores the SCP subsystem snapshot, and to block 518 where the hypervisor subsystem stores the computing system snapshot. With reference to FIGS. 6I and 6J, in an embodiment of block 516, the high availability operations may include the data mover device 405 in the SCP subsystem 304/400 performing SCP subsystem snapshot transmission operations 616 that include retrieving the SCP subsystem snapshot generated at block 512 from the SCP memory subsystem and transmitting that SCP subsystem snapshot via the network 204 to the SCP subsystem 304/400 in the computing system 202b/300. With reference to FIGS. 6K and 6L, in an embodiment of block 518, the high availability operations may also include the hypervisor subsystem 306a performing computing system snapshot storage operations 618 that include transmitting the computing system snapshot via the central processing subsystem 306 and the SCP subsystem 304, and through the network 204 to the SCP subsystem 304/400 in the computing system 202b/300. However, while the hypervisor subsystem 306a and SCP subsystem 304 are illustrated and described as transmitting their respective computing system snapshot and SCP subsystem snapshot separately, one of skill in the art in possession of the present disclosure will recognize that coordinated hypervisor subsystem/SCP subsystem snapshot transmission operations may result in either or both of the hypervisor subsystem 306a and SCP subsystem 304 transmitting the computing system snapshot and SCP subsystem snapshot while remaining within the scope of the present disclosure as well.

Furthermore, at block 516, the SCP snapshot engine 404 in the SCP subsystem 304/400 may operate to resume the operations of the SCP components that were paused at block 508, and at block 518 the hypervisor subsystem 306a may operate to resume the operations of the central processing subsystem 306 that were paused at block 506. Thus, the performance of high availability operations according to the method 500 provides, each time the method 500 is performed, for the pausing of the central processing subsystem 306 in the computing system 202a/300 along with the SCP components included in and coupled to the SCP subsystem 304/400, the collection of state information for the central processing subsystem 306 and the SCP components included in and coupled to the SCP subsystem 304/400, the generation of a computing system snapshot using the state information for the central processing subsystem 306, the generation of an SCP subsystem snapshot using the state information for the SCP components included in and coupled to the SCP subsystem 304/400, and the storage of that computing system snapshot and SCP subsystem snapshot on the SCP subsystem 304/400 in the computing system 202b/300. As will be appreciated by one of skill in the art in possession of the present disclosure, in the event of the unavailability (e.g., failure) of the computing system 202a, the computing system snapshot(s) and SCP subsystem snapshot(s) stored on the computing system 202b/300 may be utilized to quickly and efficiently restart the virtual machine on the computing system 202b/300 that was being provided by the hypervisor subsystem 306a on the computing system 202a/300 that is now unavailable. As such, high availability operations according to the method 500 may be performed at any frequency that is sufficient to ensure that the most recent computing system snapshot and SCP subsystem snapshot provide for the restarting of that virtual machine at a desired point in time.

If, at decision block 514, live migration operations are being performed, the method 500 proceeds to decision block 520 where the method 500 proceeds depending on whether the SCP subsystem snapshot that was generated at the most recent iteration of block 512 is a final SCP subsystem snapshot. As discussed above and as will be appreciated by one of skill in the art in possession of the present disclosure, the generation of computing system snapshots and SCP subsystem snapshots may be repeated during live migration operations until the size of the computing system snapshot and SCP subsystem snapshot are below a threshold size, after which a final computing system snapshot and final SCP subsystem snapshot may be generated and used along with the previous computing system snapshots and SCP subsystem snapshots to configure the computing system 202b to provide the virtual machine that was being provided by the hypervisor subsystem 306b in the computing system 202a/300, thus migrating that virtual machine (and its workloads) from the computing system 202a to the computing system 202b.

Thus, in an embodiment of decision block 520, the live migration operations according to the method 500 may include the SCP snapshot engine 404 in the SCP subsystem 304/400 determining whether the SCP subsystem snapshot generated at block 512 is a final SCP subsystem snapshot (i.e., whether a first previous iteration of the method 500 determined that the SCP subsystem snapshot was below the threshold size discussed above, and a second previous iteration of the method 500 that was subsequent to the first previous iteration of the method 500 was then performed to generate the final SCP subsystem snapshot).

If, at decision block 520, the SCP subsystem snapshot that was generated at the most recent iteration of block 512 is not a final SCP subsystem snapshot, the method 500 proceeds to block 522 where the first SCP subsystem resumes operation of the first SCP components. In an embodiment, at block 522, the SCP snapshot engine 404 in the SCP subsystem 304/400 may operate to resume the operation of the SCP components that were paused at block 508 and, while not explicitly illustrated, one of skill in the art in possession of the present disclosure will appreciate that the hypervisor subsystem 306a may operate to resume the operation of the central processing subsystem 306 as well. Thus, the live migration operations according to the method 500 may include each of the hypervisor subsystem 306a and the SCP subsystem 304 pausing the operation of the central processing subsystem 306 and the SCP components, generating a computing system snapshot and an SCP subsystem snapshot and, if the computing system snapshot and/or the SCP subsystem snapshot are greater than a threshold size, resuming the operation of the of the central processing subsystem 306 and the SCP components.

The method 500 then proceeds to block 524 where the first SCP subsystem stores the SCP subsystem snapshot, and to block 526 where the hypervisor subsystem stores the computing system snapshot. With reference back to FIGS. 6I and 6J, in an embodiment of block 524, the live migration operations may include the data mover device 405 in the SCP subsystem 304/400 performing the SCP subsystem snapshot storage operations 616 that include retrieving the SCP subsystem snapshot generated at block 512 from the SCP memory subsystem and transmitting that SCP subsystem snapshot via the network 204 to the SCP subsystem 304/400 in the computing system 202b/300. With reference to FIGS. 6K and 6L, in an embodiment of block 526, the live migration operations may also include the hypervisor subsystem 306a performing computing system snapshot storage operations 618 that include transmitting the computing system snapshot via the central processing subsystem 306 and the SCP subsystem 304, and through the network 204 to the SCP subsystem 304/400 in the computing system 202b/300.

The method 500 then returns to block 504. As will be appreciated by one of skill in the art in possession of the present disclosure, subsequent iterations of the method 500 will include the hypervisor subsystem 306a and the SCP subsystem 304 generating differential computing system snapshots and SCP subsystem snapshots from respective central processing subsystem state information and SCP component state information that has changed since the most recent computing system snapshot and SCP subsystem snapshot was generated. As such, the method 500 may loop such that the hypervisor subsystem 306a and the SCP subsystem 304 pause the operation of the central processing subsystem 306 and the SCP components, generate a differential computing system snapshot and a differential SCP subsystem snapshot and, if the differential computing system snapshot and the differential SCP subsystem snapshot are greater than a threshold size, resume the operation of the of the central processing subsystem 306 and the SCP components and store the differential computing system snapshot and the differential SCP subsystem snapshot in the computing system 202b while, if the differential computing system snapshot and the differential SCP subsystem snapshot are smaller than the threshold size, generate a final differential computing system snapshot and a final differential SCP subsystem snapshot.

If, at decision block 520, the SCP subsystem snapshot that was generated at the most recent iteration of block 512 is a final SCP subsystem snapshot, the method 500 proceeds to block 528 where the first SCP subsystem transmits the final SCP subsystem snapshot to the second SCP subsystem in the second computing system, and to block 530 where the first hypervisor subsystem transmits the final computing system snapshot to the second computing system. With reference back to FIGS. 6I and 6J, in an embodiment of block 528, the live migration operations may include the data mover device 405 in the SCP subsystem 304/400 performing the SCP subsystem snapshot storage operations 616 that include retrieving the final differential SCP subsystem snapshot generated at the final iteration of block 512 from the SCP memory subsystem and transmitting that final differential SCP subsystem snapshot via the network 204 to the SCP subsystem 304/400 in the computing system 202b/300. With reference to FIGS. 6K and 6L, in an embodiment of block 530, the live migration operations may also include the hypervisor subsystem 306a performing computing system snapshot storage operations 618 that include transmitting the final differential computing system snapshot via the central processing subsystem 306 and the SCP subsystem 304, and through the network 204 to the SCP subsystem 304/400 in the computing system 202b/300.

The method 500 then proceeds to block 532 where the second SCP subsystem configures the second computing system using the SCP subsystem snapshots and the computing system snapshots. In an embodiment, at block 532, an SCP snapshot engine 404 in an SCP subsystem 304/400 included in the computing system 202b/300 may receive the final differential computing system snapshot and the final differential SCP subsystem snapshot and, in response, preform a variety of snapshot installation techniques known in the art to utilize the final differential computing system snapshot and the final differential SCP subsystem snapshot, along with any other computing system snapshots and the SCP subsystem snapshots received during previous iterations of the method 500, in order to configure the central processing subsystem 306, the hypervisor subsystem 306a, and the SCP subsystem 304/400 in the computing system 202a/300 to provide a virtual machine that operates the same as the virtual machine being provided by the hypervisor subsystem 306a in the computing system 202a/300, and that performs one or more workloads in the same manner as the workloads being performed by the virtual machine being provided by the hypervisor subsystem 306a in the computing system 202a/300.

Thus, systems and methods have been described that provide live migration/high availability of a server device that includes an SCP subsystem that performs control operation and stores state information to offload the performance of those control operations and the storage of that state information from that server device. For example, the live migration/high availability system of the present disclosure includes a first server device having a first SCP subsystem coupled to first server components and a first hypervisor subsystem that provides a first virtual machine. Each time the first SCP subsystem receives snapshot commands from the hypervisor subsystem, it retrieves respective SCP component state information that was not retrieved in response to a previous snapshot command from each first SCP component included in the first SCP subsystem, and uses the respective SCP component state information to generate a respective SCP subsystem snapshot based on that snapshot command. The first SCP subsystem then transmits the SCP subsystem snapshots to a second SCP subsystem in a second server device, and the second SCP subsystem uses the SCP subsystem snapshots to allow a second hypervisor subsystem on the second server device to provide a second virtual machine that operates the same as the first virtual machine. As such, a workload being provided by the server device and its SCP subsystem may be live migrated to a different server device, or backed up to provide high availability for that workload.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A live migration/high availability system, comprising:
a second computing system including a second System Control Processor (SCP) subsystem; and
a first computing system that is coupled to each of the second computing system via a network, wherein the first computing system includes:
a first hypervisor subsystem;
a plurality of first computing system components; and
a first SCP subsystem that is coupled to the hypervisor subsystem and each of the plurality of first computing system components, wherein the first SCP subsystem is configured to:
operate with the first hypervisor subsystem to use the first computing system to provide a first virtual machine, wherein the first SCP subsystem generates SCP state information that is separate from computing state information generated by the first computing system when providing the first virtual machine, and inaccessible to the first hypervisor subsystem;
receive, from the hypervisor subsystem, a plurality of snapshot commands and, each time a snapshot command is received:
retrieve, based on that snapshot command and from each of a plurality of first SCP components that are included in the first SCP subsystem, respective SCP component state information that provides the SCP state information and that was not retrieved in response to a previous snapshot command; and
generate, using the respective SCP component state information and based on that snapshot command, a respective SCP subsystem snapshot; and
transmit the SCP subsystem snapshots to the second SCP subsystem in the second computing system, wherein the SCP subsystem snapshots are configured for use with computing system snapshots generated using the computing state information in configuring the second SCP subsystem to operate along with a second hypervisor subsystem on the second computing system to provide a second virtual machine that operates the same as the first virtual machine.

2. The system of claim 1, wherein the plurality of first SCP components include at least one SCP storage device, at least one SCP processing device, and at least one SCP memory device, and
wherein the respective first SCP component state information includes first SCP subsystem settings information, data included in the at least one SCP storage device, programming instructions provided with the at least one SCP processor device, and data included in the at least one SCP memory device.

3. The system of claim 1, wherein the first SCP subsystem is configured, each time the snapshot command is received from the first hypervisor subsystem, to:
retrieve, based on that snapshot command, respective first computing system component state information from each of a plurality of first computing system components that are included in the first computing system; and generate, using the respective first computing system component state information and the respective SCP subsystem state information and based on that snapshot command, the respective SCP subsystem snapshot.

4. The system of claim 3, wherein the plurality of first computing system components include a Field Programmable Gate Array (FPGA) device, a graphics processing system, a Basic Input/Output System (BIOS) subsystem, and a boot storage device, and
wherein the respective first computing system component state information includes programming instructions provided with the FPGA device, data included in the graphics processing system, BIOS settings included in the BIOS subsystem, and a boot image included in the boot storage device.

5. The system of claim 4, wherein the plurality of first computing system components include a Baseboard Management Controller (BMC) subsystem, and
wherein the respective first computing system component state information includes BMC settings included in the BMC subsystem, and data included in the BMC subsystem.

6. The system of claim 1, wherein the first SCP subsystem includes:
a data mover device that is configured to:
retrieve the respective SCP component state information that was not retrieved in response to the previous snapshot command; and
transmit the SCP subsystem snapshots to the second SCP subsystem in the second computing system.

7. A first System Control Processor (SCP) subsystem, comprising:
a System Control Processor (SCP) processing system; and
an SCP memory system that is coupled to the SCP processing system and that includes instructions that, when executed by the SCP processing system, cause the SCP processing system to provide an SCP snapshot engine that is configured to:
operate with a first hypervisor subsystem in a first computing system that includes the SCP snapshot engine to use the first computing system to provide a first virtual machine, wherein the SCP snapshot engine generates SCP state information that is separate from computing state information generated by the first computing system when providing the first virtual machine, and inaccessible to the first hypervisor subsystem;
receive, from the first hypervisor subsystem, a plurality of snapshot commands and, each time a snapshot command is received:
retrieve, based on that snapshot command and from each of a plurality of first SCP components that are included in the first SCP subsystem, respective SCP component state information that provides the SCP state information and that was not retrieved in response to a previous snapshot command; and
generate, using the respective SCP component state information and based on that snapshot command, a respective SCP subsystem snapshot; and
transmit the SCP subsystem snapshots to a second SCP subsystem in a second computing system, wherein the SCP subsystem snapshots are configured for use with computing system snapshots generated using the computing state information in configuring the second SCP subsystem to operate along with a second hypervisor subsystem on the second computing system to provide a second virtual machine that operates the same as the first virtual machine.

8. The SCP subsystem of claim 7, wherein the plurality of first SCP components include at least one SCP storage device, at least one SCP processing device, and at least one SCP memory device, and
wherein the respective first SCP component state information includes first SCP subsystem settings information, data included in the at least one SCP storage device, programming instructions provided with the at least one SCP processor device, and data included in the at least one SCP memory device.

9. The SCP subsystem of claim 7, wherein the SCP snapshot engine is configured, each time the snapshot command is received from the first hypervisor subsystem, to:
retrieve, based on that snapshot command, respective first computing system component state information from each of a plurality of first computing system components that are included in the first computing system; and
generate, using the respective first computing system component state information and the respective SCP subsystem state information and based on that snapshot command, the respective SCP subsystem snapshot.

10. The SCP subsystem of claim 9, wherein the plurality of first computing system components include a Field Programmable Gate Array (FPGA) device, a graphics processing system, a Basic Input/Output System (BIOS) subsystem, and a boot storage device, and
wherein the respective first computing system component state information includes programming instructions provided with the FPGA device, data included in the graphics processing system, BIOS settings included in the BIOS subsystem, and a boot image included in the boot storage device.

11. The SCP subsystem of claim 10, wherein the plurality of first computing system components include a Baseboard Management Controller (BMC) subsystem, and
wherein the respective first computing system component state information includes BMC settings included in the BMC subsystem, and data included in the BMC subsystem.

12. The SCP subsystem of claim 7, further comprising:
a data mover device that is coupled to the SCP processing system and that is configured to:
retrieve the respective SCP component state information that was not retrieved in response to the previous snapshot command; and
transmit the SCP subsystem snapshots to the second SCP subsystem in the second computing system.

13. The SCP subsystem of claim 7, wherein the SCP snapshot engine is configured, each time a snapshot command is received, to:
pause, based on that snapshot command, operation of each of the plurality of first SCP components that are included in the first SCP subsystem; and
resume, subsequent to retrieving the respective SCP component state information based on that snapshot command that was not retrieved in the previous snapshot command, operation of each of the plurality of first SCP components that are included in the first SCP subsystem.

14. A method for providing live migration/high availability in a computing system, comprising:
operating, by a first System Control Processor (SCP) subsystem in a first computing system from a first hypervisor subsystem in the first computing system, with the first hypervisor subsystem to use the first computing system to provide a first virtual machine, wherein the first SCP subsystem generates SCP state information that is separate from computing state information generated by the first computing system when providing the first virtual machine, and inaccessible to the first hypervisor subsystem;

receiving, by the first SCP subsystem, a plurality of snapshot commands and, each time a snapshot command is received:

retrieving, by the first SCP subsystem based on that snapshot command and from each of a plurality of first SCP components that are included in the first SCP subsystem, respective SCP component state information that provides the SCP state information and that was not retrieved in response to a previous snapshot command; and generating, by the first SCP subsystem using the respective SCP component state information and based on that snapshot command, a respective SCP subsystem snapshot; and transmitting, by the first SCP subsystem, the SCP subsystem snapshots to a second SCP subsystem in a second computing system, wherein the SCP subsystem snapshots are configured for use with computing system snapshots generated using the computing state information in configuring the second SCP subsystem to operate along with a second hypervisor subsystem on the second computing system to provide a second virtual machine that operates the same as the first virtual machine.

15. The method of claim 14, wherein the plurality of first SCP components include at least one SCP storage device, at least one SCP processing device, and at least one SCP memory device, and wherein the respective first SCP component state information includes first SCP subsystem settings information, data included in the at least one SCP storage device, programming instructions provided with the at least one SCP processor device, and data included in the at least one SCP memory device.

16. The method of claim 14, further comprising, each time a snapshot command is received:

retrieving, by the first SCP subsystem based on that snapshot command, respective first computing system component state information from each of a plurality of first computing system components that are included in the first computing system; and generating, by the first SCP subsystem using the respective first computing system component state information and the respective SCP subsystem state information and based on that snapshot command, the respective SCP subsystem snapshot.

17. The method of claim 16, wherein the plurality of first computing system components include a Field Programmable Gate Array (FPGA) device, a graphics processing system, a Basic Input/Output System (BIOS) subsystem, and a boot storage device, and wherein the respective first computing system component state information includes programming instructions provided with the FPGA device, data included in the graphics processing system, BIOS settings included in the BIOS subsystem, and a boot image included in the boot storage device.

18. The method of claim 17, wherein the plurality of first computing system components include a Baseboard Management Controller (BMC) subsystem, and wherein the respective first computing system component state information includes BMC settings included in the BMC subsystem, and data included in the BMC subsystem.

19. The method of claim 14, further comprising:

retrieving, by a data mover device in the first SCP subsystem, the respective SCP component state information that was not retrieved in the previous snapshot command; and transmitting, by the data mover device in the first SCP subsystem, the SCP subsystem snapshots to the second SCP subsystem in the second computing system.

20. The method of claim 14, further comprising, each time a snapshot command is received:

pausing, by the first SCP subsystem based on that snapshot command, operation of each of the plurality of first SCP components that are included in the first SCP subsystem; and resuming, by the first SCP subsystem subsequent to retrieving the respective SCP component state information based on that snapshot command that was not retrieved in response to the previous snapshot command, operation of each of the plurality of first SCP components that are included in the first SCP subsystem.

* * * * *

UNITED STATES PATENT AND TRADEMARK OFFICE
CERTIFICATE OF CORRECTION

PATENT NO. : 11,327,852 B1
APPLICATION NO. : 17/077869
DATED : May 10, 2022
INVENTOR(S) : Dawkins et al.

It is certified that error appears in the above-identified patent and that said Letters Patent is hereby corrected as shown below:

In the Claims

Claim 1, Column 20, Line 9, "a first computing system that is coupled to each of the" should read --a first computing system that is coupled to the--.

Signed and Sealed this
Twenty-sixth Day of July, 2022

Katherine Kelly Vidal
*Director of the United States Patent and Trademark Office*